United States Patent
Kobashi

(10) Patent No.: US 10,649,936 B2
(45) Date of Patent: May 12, 2020

(54) ACCESS CONTROL APPARATUS AND ACCESS CONTROL METHOD

(71) Applicant: FUJITSU LIMITED, Kawasaki-shi, Kanagawa (JP)

(72) Inventor: Kyuu Kobashi, Kawasaki (JP)

(73) Assignee: FUJITSU LIMITED, Kawasaki (JP)

(\*) Notice: Subject to any disclaimer, the term of this patent is extended or adjusted under 35 U.S.C. 154(b) by 11 days.

(21) Appl. No.: 15/686,200

(22) Filed: Aug. 25, 2017

(65) Prior Publication Data

US 2018/0074982 A1 Mar. 15, 2018

(30) Foreign Application Priority Data

Sep. 9, 2016 (JP) .................................. 2016-177051

(51) Int. Cl.
  *G06F 13/28* (2006.01)
  *G06F 11/20* (2006.01)
  *G06F 11/16* (2006.01)
  *G06F 13/42* (2006.01)

(52) U.S. Cl.
  CPC .............. *G06F 13/28* (2013.01); *G06F 11/16* (2013.01); *G06F 11/2005* (2013.01); *G06F 11/2007* (2013.01); *G06F 11/2092* (2013.01); *G06F 13/42* (2013.01)

(58) Field of Classification Search
  None
  See application file for complete search history.

(56) References Cited

U.S. PATENT DOCUMENTS

| | | | | |
|---|---|---|---|---|
| 5,706,444 | A * | 1/1998 | Dobbins | G06F 1/22 710/100 |
| 7,752,361 | B2 * | 7/2010 | Rangan | G06F 3/0613 710/74 |
| 9,298,240 | B2 * | 3/2016 | Zettsu | G06F 12/02 |
| 2004/0141498 | A1 * | 7/2004 | Rangan | G06F 3/0613 370/380 |
| 2004/0148376 | A1 * | 7/2004 | Rangan | G06F 3/0613 709/223 |

(Continued)

FOREIGN PATENT DOCUMENTS

JP 2005-331999 12/2005
JP 2009-223702 10/2009

*Primary Examiner* — Henry Tsai
*Assistant Examiner* — Aurangzeb Hassan
(74) *Attorney, Agent, or Firm* — Xsensus LLP

(57) ABSTRACT

An access control apparatus includes a memory, and a processor coupled to the memory and configured to, in response to an access request to a storage device, output an access command through a first path to a first controller among a plurality of controllers that control the storage device, the access command being a command to access the storage device, when no response to the access command to the first controller is received before a predetermined time passes after the output of the access command, control a second controller different from the first controller among the plurality of controllers through a second path coupled to the second controller such that the second controller stops processing executed by the first controller according to the access command, and output the access command through the second path after receiving a response to the control on the second controller.

9 Claims, 29 Drawing Sheets

(56) References Cited

U.S. PATENT DOCUMENTS

| | | | |
|---|---|---|---|
| 2007/0162708 A1* | 7/2007 | Wang | G06F 3/0607 |
| | | | 711/154 |
| 2009/0235110 A1 | 9/2009 | Kurokawa | |
| 2010/0205330 A1* | 8/2010 | Noborikawa | G06F 11/2058 |
| | | | 710/38 |
| 2011/0231589 A1* | 9/2011 | Wu | G06F 13/364 |
| | | | 710/110 |
| 2015/0046617 A1* | 2/2015 | Shirlen | G06F 13/36 |
| | | | 710/117 |
| 2017/0221173 A1* | 8/2017 | Acharya | G06T 1/20 |
| 2017/0244500 A1* | 8/2017 | Wilson | H04B 17/0085 |

* cited by examiner

ACCESS CONTROL APPARATUS AND ACCESS CONTROL METHOD

CROSS-REFERENCE TO RELATED APPLICATION

This application is based upon and claims the benefit of priority of the prior Japanese Patent Application No. 2016-177051, filed on Sep. 9, 2016, the entire contents of which are incorporated herein by reference.

FIELD

The embodiment discussed herein is related to an access control apparatus and an access control method.

BACKGROUND

There has heretofore been a storage system with a multipath configuration in which a server and a storage apparatus are coupled through a plurality of paths and, when a failure occurs in one path, access (input/output (I/O)) to a storage device included in the storage apparatus is made through another path.

As a related conventional technique, there is a technique in which when no response to an I/O request sent to an external storage device through a certain path is not received even after a certain period of time, for example, the same I/O request is sent to the external storage device through another path. There is also a technique of predicting a timeout time for an I/O request based on statistical information, detecting an error attributable to an I/O device or a path when there is no I/O response to the I/O request within the predicted timeout time, and performing time-out processing. These techniques are disclosed, for example, in Japanese Laid-open Patent Publication Nos. 2005-331999 and 2009-223702.

SUMMARY

According to an aspect of the invention, an access control apparatus includes a memory, and a processor coupled to the memory and configured to, in response to an access request to a storage device, output an access command through a first path to a first controller among a plurality of controllers that control the storage device, the access command being a command to access the storage device, when no response to the access command to the first controller is received before a predetermined time passes after the output of the access command, control a second controller different from the first controller among the plurality of controllers through a second path coupled to the second controller such that the second controller stops processing executed by the first controller according to the access command, and output the access command through the second path after receiving a response to the control on the second controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the conventional technique described above, the multipath configuration may cause an increase in time it takes for a server to respond to the request source of the access request after receiving the access request. For example, after the access command is outputted from a first path, the server switches the path for outputting the access command after waiting for an error response to be received from the first path. This leads to an increase in time it takes to respond to the request source of the access request.

It is also conceivable, for example, that the server may output a cancel command to cancel the access command to the first path before switching the path for outputting the access command. Thus, the server does not have to wait for the error response from the first path. However, unless the server supports the cancel command, such a configuration leads to possible destruction of data and causes an increase in time it takes to respond to the request source of the access request.

According to an aspect of the embodiment discussed herein, it is an object of the embodiment to provide an access control apparatus, an access control method, and an access control program, which are capable of suppressing an increase in time it takes to respond to the request source of the access request.

Hereinafter, with reference to the drawings, detailed description is given of an embodiment of an access control apparatus, an access control method, and an access control program.

(Example of Access Control Method According to Embodiment)

Figure 1:
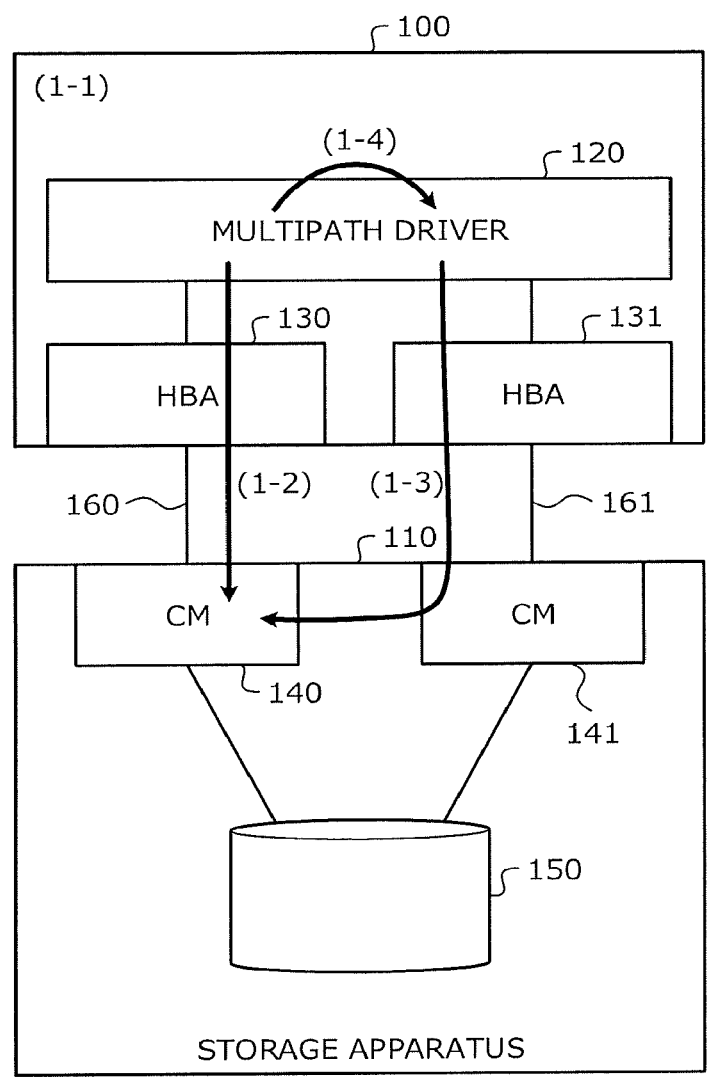
FIG. 1 is an explanatory diagram illustrating an example of an access control method according to an embodiment.

FIG. 1 is an explanatory diagram illustrating an example of an access control method according to an embodiment. An access control apparatus 100 is a computer coupled to a storage apparatus 110 through a plurality of paths and configured to receive an access request to a storage device 150 included in the storage apparatus 110 and to control access to the storage device 150 included in the storage apparatus 110.

<First-Generation Method>

Here, there has heretofore been a first-generation storage system as a storage system with a multipath configuration. In the first-generation storage system, for example, a server controls host bus adapters (HBAs) to sequentially output access commands until any of the HBAs succeeds in accessing.

The server outputs a normal response to a request source of the access request when notified by any of the HBAs of the successful access, and outputs an error response to the request source of the access request when notified by each of the HBAs of the failure to access. The HBA notifies the server of the failure to access when a predetermined time has passed without any response to the access command since the output of the access command.

However, in the first-generation storage system, the time it takes for the server to finish the access to the storage device included in the storage apparatus after the receipt of the access request sometimes exceeds an allowable time for the request source of the access request. In other words, the time it takes for the server to output a response to the request source of the access request after the receipt of the access request sometimes exceeds an allowable time for the request source of the access request to receive the response, which is set for the request source of the access request.

For example, the time it takes for the server to output a response to the request source of the access request when the respective HBAs fail to access corresponds to the cumulative total of the times it takes to determine that the respective HBAs have failed to access. Therefore, the time it takes for the server to output a response to the request source of the access request is more likely to be increased.

When the HBA has a relatively large processing load or in case of failure on a path between the HBA and the storage apparatus, the time it takes for the server to output a response to the request source of the access request is further more likely to be increased. As a result, it is sometimes not preferable to apply the first-generation storage system to a financial system or the like in which the allowable time for the request source of the access request to receive the response is likely to be relatively reduced.

<Second-Generation Method>

On the other hand, as the storage system with a multipath configuration, there is also a second-generation storage system in which the time it takes for a server to output a response to a request source of an access request is less likely to be increased, compared with the first-generation storage system. In the second-generation storage system, for example, the server outputs an access command to the second HBA when a predetermined time has passed since the output of an access command to the first HBA even before notified by the first HBA of the failure to access.

When the predetermined time has passed even before notified by the first HBA of the failure to access, the server outputs a cancel command to the first HBA to stop access processing, if any, executed by the storage apparatus, thereby suppressing destruction of data. For example, a value smaller than a predetermined time it takes to determine that the HBA has failed to access is set for a predetermined time it takes for the server to determine to output the cancel command to the first HBA.

However, the second-generation storage system may not be realized when an operating system (OS) of the server does not support an interface for outputting the cancel command. Therefore, the time it takes for the server to output a response to the request source of the access request is likely to be increased when the OS of the server does not support the interface for outputting the cancel command. As a result, the time it takes for the server to output a response to the request source of the access request sometimes exceeds an allowable time for the request source of the access request to receive the response.

Meanwhile, in the second-generation storage system, when a failure occurs on a path between the HBA and the storage apparatus, it is difficult to suppress destruction of data and the time it takes for the server to output a response to the request source of the access request is sometimes increased. For example, when a failure occurs on the path between the HBA and the storage apparatus, the cancel command outputted from the HBA does not reach the storage apparatus, and therefore access processing executed by the storage apparatus may not sometimes be stopped.

Therefore, in this embodiment, description is given of an access control method for suppressing an increase in time it takes to respond to the request source of the access request while reducing destruction of data even when the OS of the server does not support the interface for outputting the cancel command.

In the example of FIG. 1, the access control apparatus 100 is coupled to the storage apparatus 110 through a plurality of paths. The access control apparatus 100 executes a multipath driver 120, and includes an HBA 130 and an HBA 131. The storage apparatus 110 includes a controller module (CM) 140, a CM 141, and the storage device 150.

The multipath driver 120 may receive an access request to the storage device 150 included in the storage apparatus 110, and control the HBAs 130 and 131 to output access commands.

The HBA 130 is coupled to the CM 140 in the storage apparatus 110 through a path 160, and may allow the CM 140 to access the storage device 150 by outputting the access command to the CM 140 under the control of the multipath driver 120. The HBA 131 is coupled to the CM 141 in the storage apparatus 110 through a path 161, and may allow the CM 141 to access the storage device 150 by outputting the access command to the CM 141 under the control of the multipath driver 120.

The CM 140 is a controller, which is coupled to the HBA 130 in the access control apparatus 100 through a path 160 and receives an access command from the HBA 130 to access the storage device 150. The CM 141 is a controller, which is coupled to the HBA 131 in the access control apparatus 100 through a path 161 and receives an access command from the HBA 131 to access the storage device 150. The storage device 150 is, for example, a disk driver. The storage device 150 may be, for example, a solid state drive (SSD).

(1-1) The access control apparatus 100 receives the access request to the storage device 150. The access control apparatus 100 receives an access request outputted by application software or the like executed by the access control apparatus 100, through the multipath driver 120, for example. Alternatively, the access control apparatus 100 may receive an access request to the storage device 150 from another computer through the multipath driver 120, for example.

(1-2) Upon receipt of the access request, the access control apparatus 100 outputs an access command to the storage device 150 through a first path through which a first CM among a plurality of CMs that control the storage device 150 is coupled to the access control apparatus 100. Upon receipt of the access command through the multipath driver 120, for example, the access control apparatus 100 outputs the access command to the storage device 150 through the path 160.

(1-3) The access control apparatus 100 determines whether or not a response to the access command to the first CM is received, before a predetermined time passes after the output of the access command. Upon receipt of no response even after the predetermined time has passed, the access control apparatus 100 controls a second CM among the plurality of CMs through a second path through which the second CM is coupled to the access control apparatus 100 such that the second CM stops processing executed by the first CM according to the access command.

The access control apparatus 100 uses the multipath driver 120, for example, to determine whether or not a response to the access command to the CM 140 is received before a predetermined time passes after the output of the access command. If no response is received even after the predetermined time has passed, the access control apparatus 100 uses the multipath driver 120, for example, to control the CM 141 through the path 161 such that the CM 141 stops processing executed by the CM 140 according to the access command.

(1-4) After a response to the control to stop the processing executed by the first CM according to the access command is received from the second CM, the access control apparatus 100 outputs an access command through the second path. If a response indicating that the processing executed by the CM 140 according to the access command is stopped is received from the CM 141, the access control apparatus 100 uses the multipath driver 120, for example, to output an access command through the path 161.

Thus, the access control apparatus 100 may output an access command from the HBA 131 before notified by the HBA 130 of the failure to access after outputting the access command from the HBA 130. As a result, the access control apparatus 100 may make it easier to reduce the time it takes to output a response to the request source of the access request.

Moreover, the access control apparatus 100 may control the CM 141 through the HBA 131 to stop the processing by the CM 140, and may reduce destruction of data even when a cancel command may not be outputted directly to the CM 140 from the HBA 130.

Thus, the access control apparatus 100 may suppress an increase in time it takes to access the storage device 150 while reducing the destruction of data even when the OS does not support the interface for outputting the cancel command. As a result, it is preferable to apply the access control apparatus 100 to a financial system or the like in which an allowable time for the request source of the access request to receive a response is likely to be relatively reduced. Moreover, the access control apparatus 100 may suppress an increase in time it takes to access the storage device 150 while reducing the destruction of data even when a failure occurs on the path 160 and the cancel command may not be outputted through the path 160.

Here, the description is given of the case where one server is coupled to one storage apparatus 110. However, the embodiment is not limited thereto. For example, the server may be coupled to one or more storage apparatuses 110. Likewise, for example, the storage apparatus 110 may be coupled to one or more servers.

(Example of Storage System 200)

Figure 2:
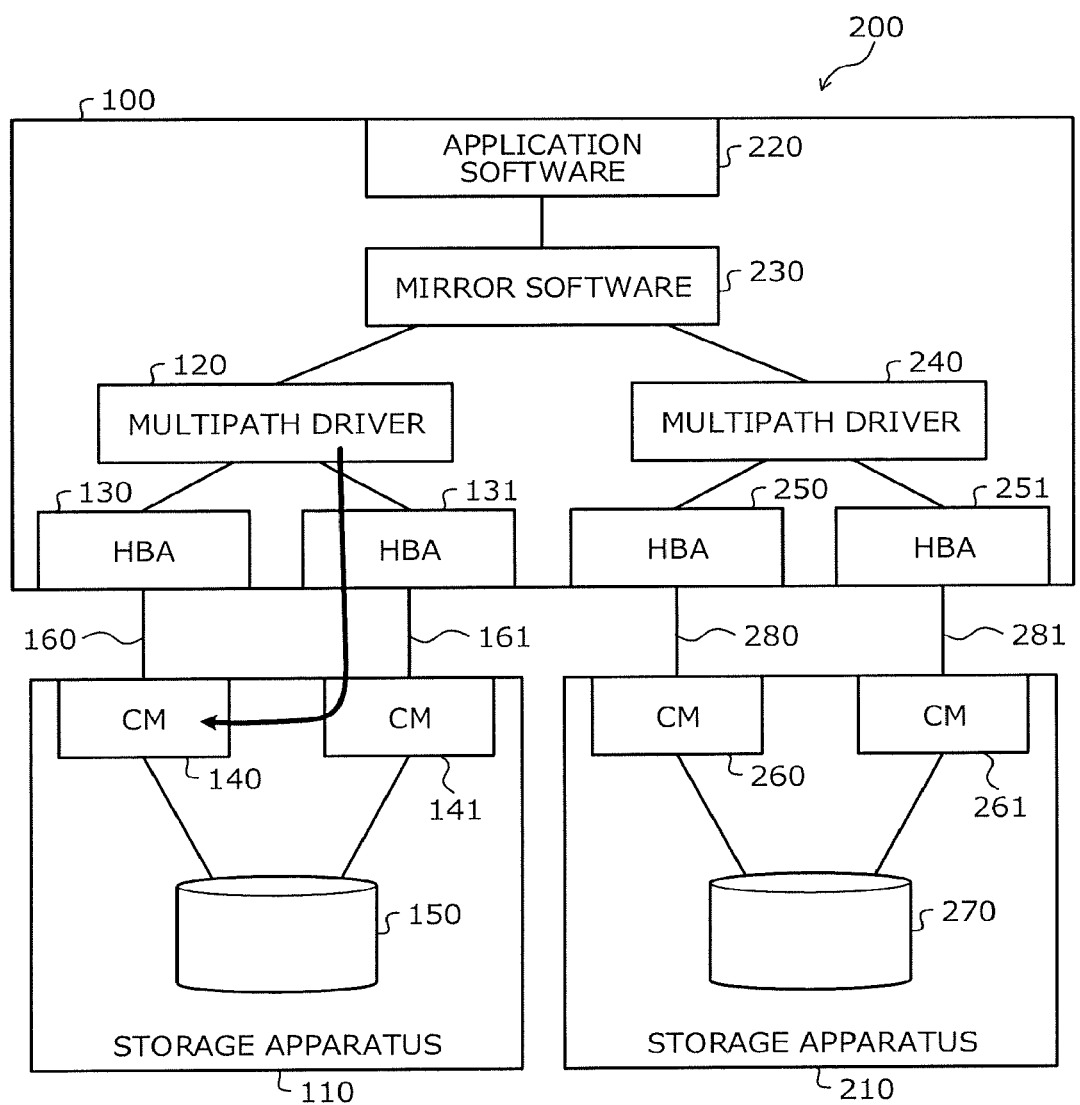
FIG. 2 is an explanatory diagram illustrating an example of a storage system.

Next, with reference to FIG. 2, description is given of an example of a storage system 200 to which the access control apparatus 100 illustrated in FIG. 1 is applied. Hereinafter, the same components as those illustrated in FIG. 1, among the components illustrated in FIG. 2, may be denoted by the same reference numerals as those in FIG. 1.

FIG. 2 is an explanatory diagram illustrating an example of the storage system 200. In the example of FIG. 2, the storage system 200 includes an access control apparatus 100, a storage apparatus 110, and a storage apparatus 210. In the storage system 200, the access control apparatus 100 is coupled to the storage apparatus 110 through a plurality of paths. Likewise, in the storage system 200, the access control apparatus 100 is coupled to the storage apparatus 210 through a plurality of paths.

In the access control apparatus 100, programs run, such as an application software 220, a mirror software 230, a multipath driver 120, and a multipath driver 240. The access control apparatus 100 includes an HBA 130, an HBA 131, an HBA 250, and an HBA 251. The storage apparatus 110 includes a CM 140, a CM 141, and a storage device 150. The storage apparatus 210 includes a CM 260, a CM 261, and a storage device 270.

The application software 220 outputs an access request to at least either one of the multipath driver 120 and multipath driver 240 through the mirror software 230. The mirror software 230 outputs the access request outputted by the application software 220 to at least either one of the multipath driver 120 and multipath driver 240.

As in the case of FIG. 1, the multipath driver 120 may receive an access request to the storage device 150 included in the storage apparatus 110 and control the HBAs 130 and 131 to output access commands. The multipath driver 240 may receive an access request to the storage device 270 included in the storage apparatus 210 and control the HBA 250 and HBA 251 to output access commands.

The HBA 130 is coupled to the CM 140 in the storage apparatus 110 through a path 160, and may allow the CM 140 to access the storage device 150 by outputting the access command to the CM 140 under the control of the multipath driver 120. The HBA 131 is coupled to the CM 141 in the storage apparatus 110 through a path 161, and may allow the CM 141 to access the storage device 150 by outputting the access command to the CM 141 under the control of the multipath driver 120.

The HBA 250 is coupled to the CM 260 in the storage apparatus 210 through a path 280, and may allow the CM 260 to access the storage device 270 by outputting the access command to the CM 260 under the control of the multipath driver 240. The HBA 251 is coupled to the CM 261 in the storage apparatus 210 through a path 281, and may allow the CM 261 to access the storage device 270 by outputting the access command to the CM 261 under the control of the multipath driver 240.

The CM 140 is coupled to the HBA 130 in the access control apparatus 100 through the path 160 and receives the access command from the HBA 130 to access the storage device 150. The CM 141 is coupled to the HBA 131 in the access control apparatus 100 through the path 161 and receives the access command from the HBA 131 to access the storage device 150. The storage device 150 is, for example, a disk driver. The storage device 150 may be, for example, an SSD.

The CM 260 is coupled to the HBA 250 in the access control apparatus 100 through the path 280 and receives the access command from the HBA 250 to access the storage device 270. The CM 261 is coupled to the HBA 251 in the access control apparatus 100 through the path 281 and receives the access command from the HBA 251 to access the storage device 270. The storage device 270 is, for example, a disk driver. The storage device 270 may be, for example, an SSD.

The access control apparatus 100 uses the mirror software 230 to output the access request outputted by the application software 220 to at least either one of the multipath driver 120 and multipath driver 240. When the access request outputted by the application software 220 is a read request, for example, the access control apparatus 100 sorts the read request to either one of the multipath driver 120 and multipath driver 240.

On the other hand, when the access request outputted by the application software 220 is a write request, for example, the access control apparatus 100 outputs the write request to both of the multipath driver 120 and multipath driver 240. When receiving the access request through the multipath driver 120, the access control apparatus 100 controls the access to the storage device 150. When receiving the access request through the multipath driver 240, the access control apparatus 100 controls the access to the storage device 270.

The access control apparatus 100 receives a response to the access request outputted to the multipath driver 120 or multipath driver 240 by the mirror software 230 from the multipath driver 120 or multipath driver 240. Then, the access control apparatus 100 outputs a response to the access request from the application software 220 to the application software 220 based on the response received from the multipath driver 120 or multipath driver 240. The access control apparatus 100 cancels mirroring when determining that there is a failure in the storage apparatus 110 or storage apparatus 210, based on the response received from the multipath driver 120 or multipath driver 240 through the mirror software 230.

Meanwhile, there is a case where no response to the access request is received from the multipath driver 120 even after a preset standby time has passed since the output of the access request to the multipath driver 120 by the mirror software 230, for example. As for the standby time, for example, a time that is longer than the time it takes for the multipath driver 120 to determine that there is no response to the access command using one of the paths, and that is shorter than the time it takes to further determine that there is also no response to the access command using the other path. In this case, the access control apparatus 100 may cancel mirroring when determining that there is a failure in the storage apparatus 110 even if there is no error response to the access request outputted to the multipath driver 120 by the mirror software 230.

When the access request is the read request, the access control apparatus 100 may output, through the mirror software 230, the read request to the multipath driver 240, to which the read request is not to be outputted yet, after canceling the mirroring. On the other hand, when the access request is the write request, the access control apparatus 100 may output a response to the access request from the application software 220, based on the response received from the multipath driver 240, after canceling the mirroring. Here, the description is given of the case where the access request is outputted to the multipath driver 120 by the mirror software 230. However, the same goes for the case where the access request is outputted to the multipath driver 240. The access control apparatus 100 is, for example, a server.

The storage apparatus 110 receives an access command and accesses the storage device 150 based on the access command. The storage apparatus 110 may stop processing executed by the CM 141 by using the CM 140. The storage apparatus 110 may stop the processing executed by the CM 141, for example, by causing the CM 140 to output a cancel command to the CM 141. Likewise, the storage apparatus 110 may stop processing executed by the CM 140 by using the CM 141.

The storage apparatus 210 receives an access command and accesses the storage device 270 based on the access command. The storage apparatus 210 may stop processing executed by the CM 261 by using the CM 260. The storage apparatus 210 may stop the processing executed by the CM 261, for example, by causing the CM 260 to output a cancel command to the CM 261. Likewise, the storage apparatus 210 may stop processing executed by the CM 260 by using the CM 261.

Here, the description is given of the case where the mirror software 230 runs in the access control apparatus 100. The embodiment is not limited thereto. For example, there may be a case where the mirror software 230 does not run in the access control apparatus 100. In this case, the application software 220 outputs the access request to the multipath driver 120 or the multipath driver 240 without through the mirror software 230.

(Another Example of Storage System 200)

Figure 3:
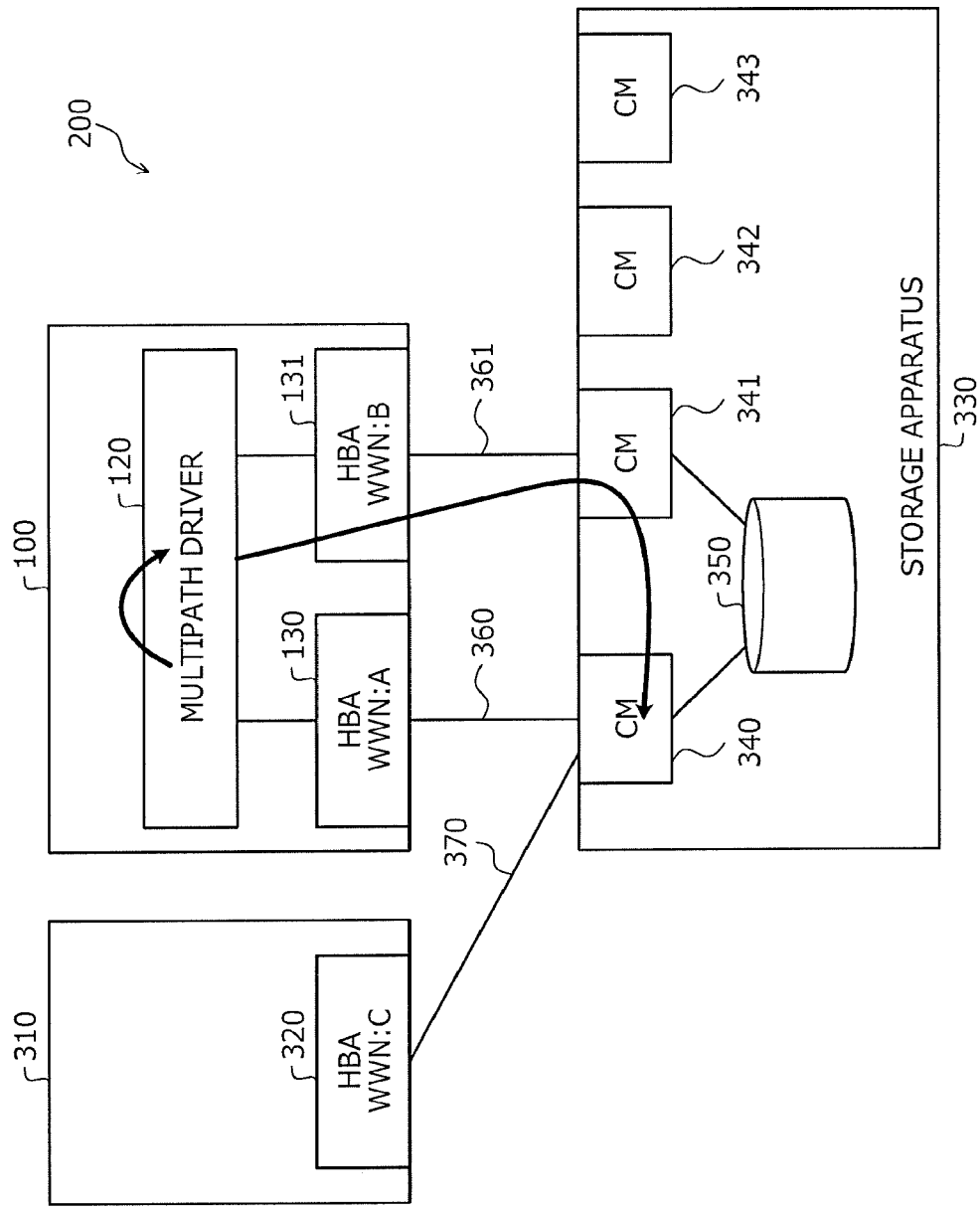
FIG. 3 is an explanatory diagram illustrating another example of the storage system.

Next, with reference to FIG. 3, description is given of another example of the storage system 200 to which the access control apparatus 100 illustrated in FIG. 1 is applied. Hereinafter, the same components as those illustrated in FIG. 1, among the components illustrated in FIG. 3, may be denoted by the same reference numerals as those in FIG. 1.

FIG. 3 is an explanatory diagram illustrating another example of the storage system 200. In the example of FIG.

3, the storage system 200 includes an access control apparatus 100, a server 310, and a storage apparatus 330. In the storage system 200, the access control apparatus 100 is coupled to the storage apparatus 330 through a plurality of paths. Likewise, in the storage system 200, the server 310 is coupled to the storage apparatus 330 through a path.

The access control apparatus 100 executes a multipath driver 120. The access control apparatus 100 includes an HBA 130 and an HBA 131. The server 310 includes an HBA 320. The storage apparatus 330 includes CMs 340 to 343 and a storage device 350.

The multipath driver 120 may receive an access request to the storage device 350 included in the storage apparatus 330 and control the HBAs 130 and 131 to output access commands.

The HBA 130 is coupled to the CM 340 in the storage apparatus 330 through a path 360, and may allow the CM 340 to access the storage device 350 by outputting the access command to the CM 340 under the control of the multipath driver 120. "WWN:A" is attached to the HBA 130.

The HBA 131 is coupled to the CM 341 in the storage apparatus 330 through a path 361, and may allow the CM 341 to access the storage device 350 by outputting the access command to the CM 341 under the control of the multipath driver 120. "WWN:B" is attached to the HBA 131.

The HBA 320 is coupled to the CM 340 in the storage apparatus 330 through a path 370, and may allow the CM 340 to access the storage device 350 by outputting the access command to the CM 340. "WWN:C" is attached to the HBA 320.

The CM 340 is coupled to the HBA 130 in the access control apparatus 100 through the path 360, and receives the access command from the HBA 130 to access the storage device 350. The CM 340 is coupled to the HBA 320 in the server 310 through the path 370, and receives the access command from the HBA 320 to access the storage device 350. The CM 341 is coupled to the HBA 131 in the access control apparatus 100 through the path 361, and receives the access command from the HBA 131 to access the storage device 350.

Upon receipt of the access command, the CM 342 accesses the storage device 350. Upon receipt of the access command, the CM 343 accesses the storage device 350. The storage device 350 is, for example, a disk driver. The storage device 350 may be, for example, an SSD.

Upon receipt of the access request through the multipath driver 120, the access control apparatus 100 controls the access to the storage device 350. The access control apparatus 100 is, for example, a server. Upon receipt of the access request, the server 310 controls the access to the storage device 350.

The storage apparatus 330 receives the access command from the HBA 130 or HBA 131 and accesses the storage device 350 according to the access command. The storage apparatus 330 receives the access command from the HBA 320 and accesses the storage device 350 according to the access command.

The storage apparatus 330 may stop processing executed by the CM 341, 342, or 343 by using the CM 340. The storage apparatus 330 may stop the processing executed by the CM 341 by causing the CM 340 to output a cancel command to the CM 341.

Likewise, the storage apparatus 330 may stop processing executed by the CM 340, 342, or 343 by using the CM 341. Likewise, the storage apparatus 330 may stop processing executed by the CM 340, 341, or 343 by using the CM 342. Likewise, the storage apparatus 330 may stop processing executed by the CM 340, 341, or 342 by using the CM 343.

(Hardware Configuration Example of Access Control Apparatus 100)

Figure 4:
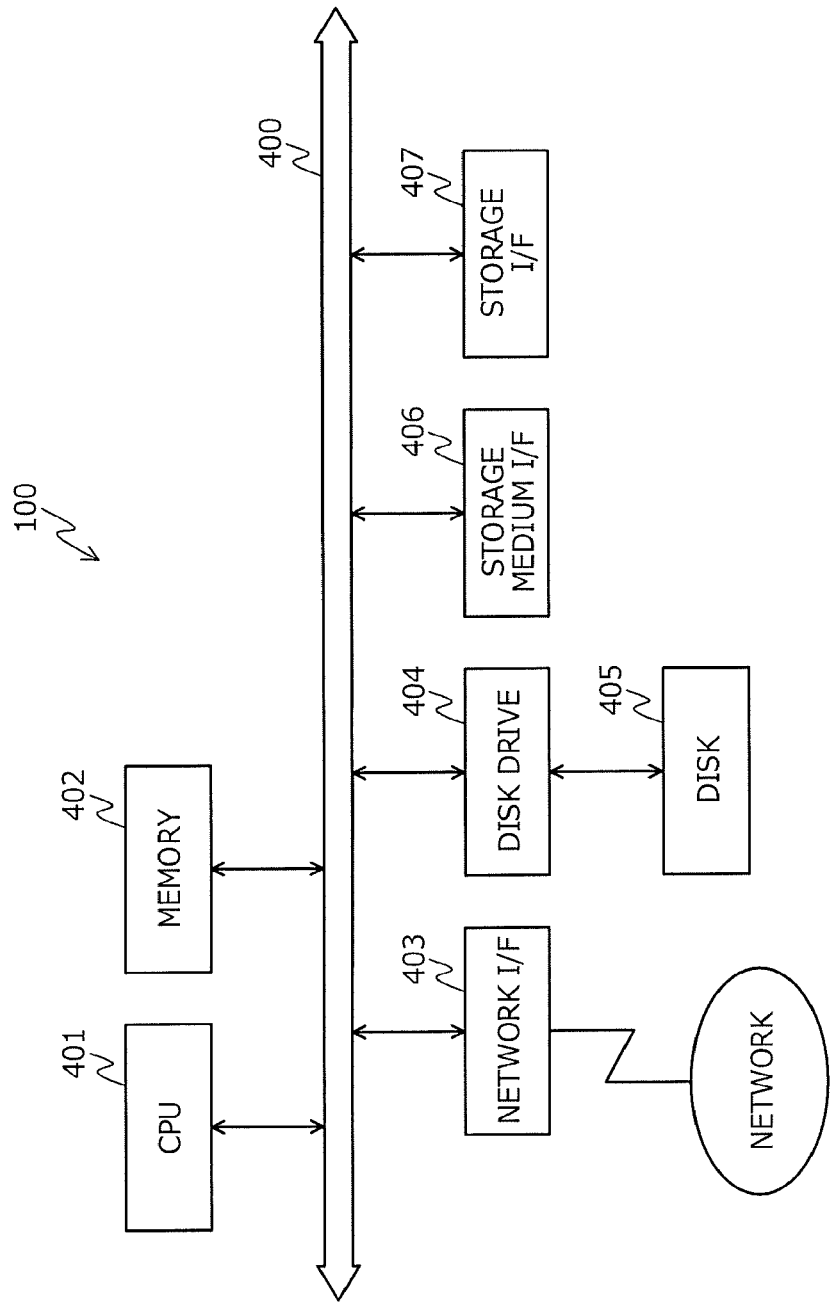
FIG. 4 is a block diagram illustrating a hardware configuration example of an access control apparatus.

Next, with reference to FIG. 4, description is given of a hardware configuration example of the access control apparatus 100.

FIG. 4 is a block diagram illustrating the hardware configuration example of the access control apparatus 100. In FIG. 4, the access control apparatus 100 includes a central processing unit (CPU) 401, a memory 402, a network interface (I/F) 403, a disk drive 404, a disk 405, a storage medium I/F 406, and a storage I/F 407. The components are coupled to each other through a bus 400.

Here, the CPU 401 performs overall control of the access control apparatus 100. The memory 402 includes, for example, a read only memory (ROM), a random access memory (RAM), a flash ROM, and the like. To be more specific, for example, the flash ROM or the ROM stores various programs, and the RAM is used as a work area for the CPU 401. The programs stored in the memory 402 are loaded into the CPU 401, thereby causing the CPU 401 to execute coding.

The network I/F 403 is coupled to a network through a communication line, and is coupled to another computer through the network. The network I/F 403 serves as an interface between the network and the inside, and controls input and output of data to and from another computer. As for the network I/F 403, for example, a modem, a LAN adapter or the like may be adopted.

The disk drive 404 controls read and write of data from and to the disk 405 under the control of the CPU 401. The disk drive 404 is, for example, a magnetic disk drive. The disk 405 is a non-volatile memory that stores data written under the control of the disk drive 404. The disk 405 is, for example, a magnetic disk, an optical disk or the like.

The storage medium I/F 406 is coupled to an external storage medium, serves as an interface between the storage medium and the inside, and controls input and output of data to and from the storage medium. The storage medium I/F 406 is, for example, a universal serial bus (USB) connector. The storage medium is, for example, a semiconductor memory. The storage I/F 407 is coupled to the storage apparatus 110, serves as an interface between the storage apparatus 110 and the inside, and controls input and output of data to and from the storage apparatus 110. The storage I/F 407 is, for example, the CM 140 or the CM 141.

The access control apparatus 100 may also include an SSD, a semiconductor memory, a keyboard, a mouse, a display, and the like, for example, besides the components described above. Moreover, the access control apparatus 100 may include an SSD, a semiconductor memory, and the like instead of the disk drive 404 and the disk 405.

(Storage Content in Coupling Information Table 500)

Figure 5:
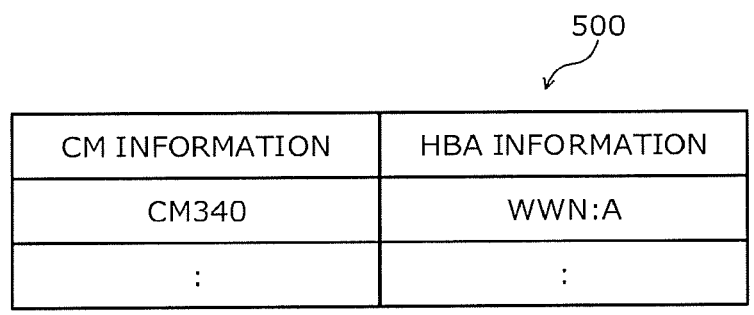
FIG. 5 is an explanatory diagram illustrating an example of contents stored in a coupling information table.

Next, with reference to FIG. 5, description is given of an example of contents stored in a coupling information table 500 stored in the access control apparatus 100. The coupling information table 500 is realized by storage regions such as the memory 402 and the disk 405 illustrated in FIG. 4, for example.

FIG. 5 is an explanatory diagram illustrating an example of the contents stored in the coupling information table 500. As illustrated in FIG. 5, the coupling information table 500 includes fields for CM information and HBA information. In the coupling information table 500, coupling information is stored as records by setting information in each of the fields for each HBA.

In the CM information field, information for identifying the CM coupled to the HBA included in the access control apparatus 100 is set. In the HBA information field, information for identifying the HBA included in the access control apparatus 100 is set. Thus, the coupling information table 500 may store the coupling information indicating a coupling relationship between the access control apparatus 100 and the storage apparatus 110.

(Functional Configuration Example of Access Control Apparatus 100)

Figure 6:
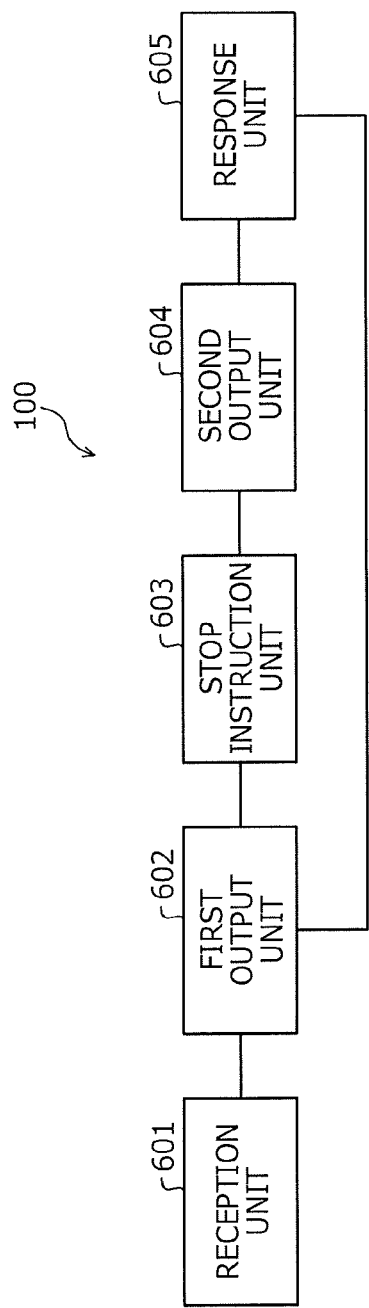
FIG. 6 is a block diagram illustrating a functional configuration example of the access control apparatus.

Next, with reference to FIG. 6, description is given of a functional configuration example of the access control apparatus 100. FIG. 6 is a block diagram illustrating the functional configuration example of the access control apparatus 100. The access control apparatus 100 includes a reception unit 601, a first output unit 602, a stop instruction unit 603, a second output unit 604, and a response unit 605.

The reception unit 601 to the response unit 605 are functions included in a controller. To be more specific, the reception unit 601 to the response unit 605 have their functions realized, for example, by the CPU 401 executing the programs stored in the storage device 150 such as the memory 402 and the disk 405 illustrated in FIG. 4, or by the various I/Fs 403, 406, and 407. The processing results obtained by the functional units are stored, for example, in the storage device 150 such as the memory 402 and the disk 405.

The reception unit 601 receives an access request to the storage device 150 included in the storage apparatus 110. The reception unit 601 receives an access request outputted by the application software 220 executed by the access control apparatus 100. The reception unit 601 may receive an access request from another computer through the network I/F 403, for example. Thus, the reception unit 601 may start controlling the access to the storage device 150 and allow the first output unit 602 to output an access command.

When the reception unit 601 receives the access request, the first output unit 602 outputs an access command to the storage device 150 through a first path. The first path is a path through which a first controller among a plurality of controllers included in the storage apparatus 110 is coupled to the access control apparatus 100. The first path is, for example, the path 160 illustrated in FIG. 2. The controllers are devices that control the access to the storage device 150 in the storage apparatus 110. The controllers are, for example, the CMs. To be more specific, the controllers are the CM 140 and CM 141 and the like illustrated in FIG. 2. More specifically, the controllers may be the CMs 340 to 343 and the like illustrated in FIG. 3.

The first output unit 602 outputs the access command to the storage device 150 from the HBA 130 to the CM 140 through the path 160 coupling the HBA 130 to the CM 140, for example. Thus, the first output unit 602 may allow the controller to access the storage device 150.

When the access command is a command to write data to the storage device 150 through direct memory access, for example, the first output unit 602 replicates the write data before outputting the access command through the path 160. Thus, the second output unit 604 may use the replicated write data, even if the write data is deleted by the direct memory access, when outputting the same access command as that outputted by the first output unit 602.

The stop instruction unit 603 determines whether or not a response to the access command to the first controller is received before a predetermined time passes after the output of the access command by the first output unit 602. When no response is received even after the elapse of the predetermined time, the stop instruction unit 603 controls a second controller through a second path such that the second controller stops processing executed by the first controller according to the access command outputted by the first output unit 602.

Here, the stop instruction unit 603 may stop at least the processing executed by the first controller according to the access command outputted by the first output unit 602. The stop instruction unit 603 may stop the first controller itself or may specify and stop the processing related to the first path by the first controller. The second path is a path through which the second controller is coupled to the access control apparatus 100. The second path is, for example, the path 161 illustrated in FIG. 2. The second controller is a device different from the first controller among the plurality of controllers.

As the predetermined time, the stop instruction unit 603 preferably uses a time not longer than the time it takes to determine that the first controller has failed to access the storage device 150. For example, the stop instruction unit 603 sets, as the predetermined time, a time not longer than the time it takes to determine a time-out when the HBA 130 or the HBA 131 outputs the access command.

The stop instruction unit 603 outputs a stop command, for example, to the second controller through the second path, thereby allowing the second controller to stop the processing executed by the first controller according to the access command outputted by the first output unit 602. To be more specific, the stop instruction unit 603 outputs a stop instruction to the CM 141 through the path 161 through which HBA 131 is coupled to the CM 141. The stop instruction is implemented as an SCSI command that may be outputted independently of the OS of the server, for example. The stop instruction is an access switch command to be described later.

Thus, the stop instruction unit 603 may allow the CM 141 to stop the processing executed by the CM 140 according to the access command outputted by the first output unit 602. As a result, the stop instruction unit 603 may reduce destruction of data by suppressing overlap between the access to the storage device 150 by the CM 140 and the access to the storage device 150 by the CM 141. To be more specific, the stop instruction unit 603 may reduce the destruction of data caused by the CM 140 re-executing the access already executed by the CM 141 after the storage device 150 is accessed more than once by the CM 141.

The stop instruction unit 603 may output a stop command including information indicating the first controller to the second controller through the second path, thereby allowing the second controller to stop the processing executed by the first controller according to the access command outputted by the first output unit 602. To be more specific, the stop instruction unit 603 acquires information for identifying the CM 340 coupled to the HBA 130 by referring to the coupling information table 500. Then, the stop instruction unit 603 outputs a stop instruction including information for identifying the CM 340 to the CM 341 through the path 361 through which the HBA 131 is coupled to the CM 341.

Thus, the stop instruction unit 603 may determine which one of the CMs 340, 342, and 343 may be stopped by the CM 341. Then, the stop instruction unit 603 may stop the processing executed by the CM 340 according to the access command outputted by the first output unit 602, by allowing the CM 341 to stop the CM 340.

The stop instruction unit 603 outputs a stop command including information indicating the first path to the second controller through the second path, for example, thereby allowing the second controller to stop processing related to the first path in the first controller. To be more specific, the stop instruction unit 603 acquires information for identifying the path 360 coupled to the HBA 130 by referring to the coupling information table 500. The information for identifying the path is, for example, WWN:A attached to the HBA 130 or the like. Then, the stop instruction unit 603 outputs a stop instruction including the information for identifying the path 360 through which the HBA 130 is coupled to the CM 340 to the CM 341 through the path 361 through which the HBA 131 is coupled to the CM 341.

Thus, the stop instruction unit 603 may determine through which one of the paths coupled to the CM 340 the processing is executed that may be stopped by the CM 341. Then, the stop instruction unit 603 may stop the processing executed by the CM 340 according to the access command outputted by the first output unit 602 by allowing the CM 341 to stop the processing executed through the path 361 by the CM 340. On the other hand, the stop instruction unit 603 may allow the processing executed by the CM 340 according to the access command outputted by the server 310 not to be stopped.

The second output unit 604 outputs an access command through the second path after receiving, from the second controller, a response to the control of stopping the processing executed by the first controller according to the access command outputted by the first output unit 602. The second output unit 604 outputs an access command to the CM 141 through the path 161 after notified by the CM 141 that the processing executed by the CM 140 according to the access command outputted by the first output unit 602 is stopped. Thus, the second output unit 604 may allow the CM 141 to execute the access while reducing the destruction of data.

If the response to the control of stopping the processing according to the access command is received from the second controller, the second output unit 604 may output an access command through the second path based on the replicated write data. The second output unit 604 is notified by the CM 141, for example, that the processing executed by the CM 140 according to the access command outputted by the first output unit 602 is stopped. When thus notified, the second output unit 604 outputs the access command to the CM 141 through the path 161 based on the replicated write data. Thus, the second output unit 604 may allow the CM 141 to execute the access command even before receiving the response to the access command outputted by the first output unit 602. Therefore, the second output unit 604 may allow the CM 141 to execute the access command by using the replicated write data even when the original write data is deleted by the direct memory access.

The second output unit 604 outputs an access command through the second path after receiving the response to the control of stopping the processing according to the access command from the second controller and receiving a response to the access command to the first controller. The response to the access command to the first controller is, for example, an error response outputted by the first controller when the processing of the access command is stopped. The response to the access command to the first controller may be, for example, an error response outputted by the HBA that controls the output of the access command to the first controller, when it is determined that there is no response from the first controller. Alternatively, the response to the access command to the first controller may be, for example, a normal response or an error response already outputted by the first controller before the processing of the access command is stopped.

The second output unit 604 is notified by the CM 141, for example, that the processing executed by the CM 140 according to the access command outputted by the first output unit 602 is stopped. After being thus notified and receiving the error response to the access command to the CM 140, the second output unit 604 outputs an access command to the CM 141 through the path 161. Thus, the second output unit 604 may output the access command without replicating the write data.

When receiving a success response from the first controller, the response unit 605 outputs the success response to the request source of the access request. For example, when receiving a success response to the access command from the CM 140, the response unit 605 outputs the success response to the request source of the access request.

When receiving the error response from the first controller and receiving a success response from the second controller, the response unit 605 outputs the success response to the request source of the access request. For example, when receiving the error response to the access command from the CM 140 and receiving the success response to the access command from the CM 141, the response unit 605 outputs the success response to the request source of the access request.

When determining that there is no response from the first controller and receiving the success response from the second controller, the response unit 605 outputs the success response to the request source of the access request. For example, when determining that there is no response to the access command from the CM 140 and receiving the success response to the access command from the CM 141, the response unit 605 outputs the success response to the request source of the access request. Here, the response unit 605 determines that there is no response from the CM 140, based on the error response outputted by the HBA 130 determining that there is no response from the CM 140, when a preset standby time has passed since the output of the access command to the CM 140, for example.

When receiving the success response from the second controller before receiving the response to the access command to the first controller, the response unit 605 may output the success response to the request source of the access request. For example, when receiving the success response to the access command from the CM 141 before receiving the response to the access command from the CM 140, the response unit 605 outputs the success response to the request source of the access request.

When receiving the error response from the first controller and receiving the error response from the second controller, the response unit 605 outputs the error response to the request source of the access request. For example, when receiving the error response to the access command from the CM 140 and receiving the error response to the access command from the CM 141, the response unit 605 outputs the error response to the request source of the access request.

When receiving the error response from the first controller and determining that there is no response from the second controller, the response unit 605 outputs the error response to the request source of the access request. For example, when receiving the error response to the access command from the CM 140 and determining that there is no response to the access command from the CM 141, the response unit 605 outputs the error response to the request source of the access request. Here, the response unit 605 determines that there is no response from the CM 141, based on the error response outputted by the HBA 131 determining that there is no response from the CM 141, when a preset standby time has passed since the output of the access command to the CM 141, for example.

When determining that there is no response from the first controller and receiving the error response from the second controller, the response unit 605 outputs the error response to the request source of the access request. For example, when determining that there is no response to the access command from the CM 140 and receiving the error response to the access command from the CM 141, the response unit 605 outputs the error response to the request source of the access request.

When determining that there is no response from the first controller and determining that there is no response from the second controller, the response unit 605 outputs the error response to the request source of the access request. For example, when determining that there is no response to the access command from the CM 140 and determining that there is no response to the access command from the CM 141, the response unit 605 outputs the error response to the request source of the access request. Thus, the response unit 605 may suppress an increase in time it takes to respond to the request source of the access request.

Hereinafter, description is given of an operation example of the access control apparatus 100 realized by the multipath driver 120 compatible with the storage apparatus 110 in the storage system 200 illustrated in FIG. 2. An operation example of the access control apparatus 100 realized by the multipath driver 240 is the same as the operation example of the access control apparatus 100 realized by the multipath driver 120, and thus description thereof is omitted.

(Operation Example 1 of Access Control Apparatus 100)

First, operation example 1 of the access control apparatus 100 is described. Operation Example 1 is an example where the HBA 131 may output an access command even before a response to the access command is received after an access command is outputted from the HBA 130.

According to this example, the access control apparatus 100 may suppress an increase in time it takes to access the storage device 150 by reducing the time it takes to output the access command from the HBA 131 after outputting the access command from the HBA 130.

(An Example of Plurality of Operation Patterns in Operation Example 1)

Figure 7:
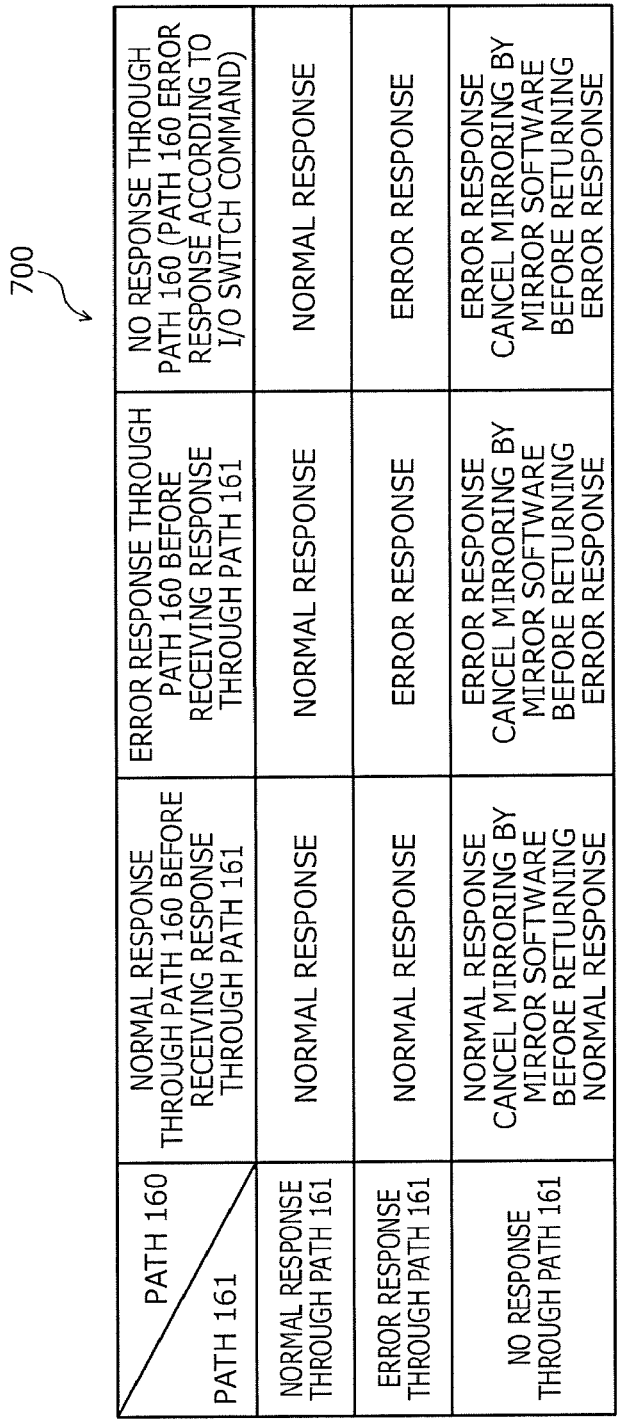
FIG. 7 is an explanatory diagram illustrating an example of a plurality of operation patterns in operation example 1.

First, with reference to FIG. 7, description is given of an example of a plurality of operation patterns in operation example 1.

FIG. 7 is an explanatory diagram illustrating an example of a plurality of operation patterns in operation example 1. As described above, upon receipt of the access request to the storage device 150, the access control apparatus 100 outputs the access command to the storage device 150 through the path 160 through which the HBA 130 is coupled to the CM 140.

Then, when receiving no response from the CM 140 even after a predetermined time has passed since the output of the access command, the access control apparatus 100 outputs an access switch command, through the path 161, to allow the CM 141 to stop the processing executed by the CM 140 according to the access command. The access switch command corresponds to the stop instruction described above, and is implemented as an SCSI command that may be outputted independently of the OS of the server.

Thereafter, when the processing executed by the CM 140 according to the access command is stopped, the access control apparatus 100 outputs an access command through the path 161 through which the HBA 131 is coupled to the CM 141, and receives a response to the access command from the CM 141. The access command may be included in the access switch command, for example.

Here, the operation pattern of the access control apparatus 100 varies depending on the kind of the response received through the path 160, the kind of the response received through the path 161, and the order of receiving the responses through the path 160 and path 161. Next, with reference to a table 700 illustrated in FIG. 7, description is given of first to ninth operation patterns in operation example 1.

The first operation pattern is an operation pattern when the access control apparatus 100 receives a normal response through the path 160 and receives a normal response through the path 161 before receiving a response to the access switch command. In the first operation pattern, the access control apparatus 100 outputs the normal response to the request source of the access request.

The second operation pattern is an operation pattern when the access control apparatus 100 receives an error response through the path 160 and receives a normal response through the path 161 before receiving a response to the access switch command. In the second operation pattern, the access control apparatus 100 outputs the normal response to the request source of the access request.

The third operation pattern is an operation pattern when the access control apparatus 100 determines that there is no response through the path 160 and receives a normal response through the path 161. In the third operation pattern, the access control apparatus 100 outputs the normal response to the request source of the access request.

The fourth operation pattern is an operation pattern when the access control apparatus 100 receives a normal response through the path 160 and receives an error response through the path 161 before receiving a response to the access switch command. In the fourth operation pattern, the access control apparatus 100 outputs the normal response to the request source of the access request.

The fifth operation pattern is an operation pattern when the access control apparatus 100 receives an error response through the path 160 and receives an error response through the path 161 before receiving a response to the access switch command. In the fifth operation pattern, the access control apparatus 100 outputs the error response to the request source of the access request.

The sixth operation pattern is an operation pattern when the access control apparatus 100 determines that there is no response through the path 160 and receives an error response through the path 161. In the sixth operation pattern, the access control apparatus 100 outputs the error response to the request source of the access request.

The seventh operation pattern is an operation pattern when the access control apparatus 100 receives a normal response through the path 160 and determines that there is no response through the path 161 before receiving a response to the access switch command. In the seventh operation pattern, the access control apparatus 100 outputs the normal response to the request source of the access request. In the seventh operation pattern, the access control apparatus 100 cancels mirroring by the mirror software 230 before outputting the normal response to the request source of the access request through the multipath driver 120. To be more specific, the mirror software 230 cancels the mirroring since the standby time described above has passed.

The eighth operation pattern is an operation pattern when the access control apparatus 100 receives an error response through the path 160 and determines that there is no response through the path 161 before receiving a response to the access switch command. In the eighth operation pattern, the access control apparatus 100 outputs the error response to the request source of the access request. Moreover, in the eighth operation pattern, the access control apparatus 100 cancels mirroring by the mirror software 230 before outputting the error response to the request source of the access request through the multipath driver 120. To be more specific, the mirror software 230 cancels the mirroring since the standby time described above has passed.

The ninth operation pattern is an operation pattern when the access control apparatus 100 determines that there is no response through the path 160 and determines that there is no response through the path 161. In the ninth operation pattern, the access control apparatus 100 outputs the error response to the request source of the access request. Moreover, in the ninth operation pattern, the access control apparatus 100 cancels mirroring by the mirror software 230 before outputting the error response to the request source of the access request through the multipath driver 120. To be more specific, the mirror software 230 cancels the mirroring since the standby time described above has passed.

(Concrete Example of First Operation Pattern in Operation Example 1)

Figure 8:
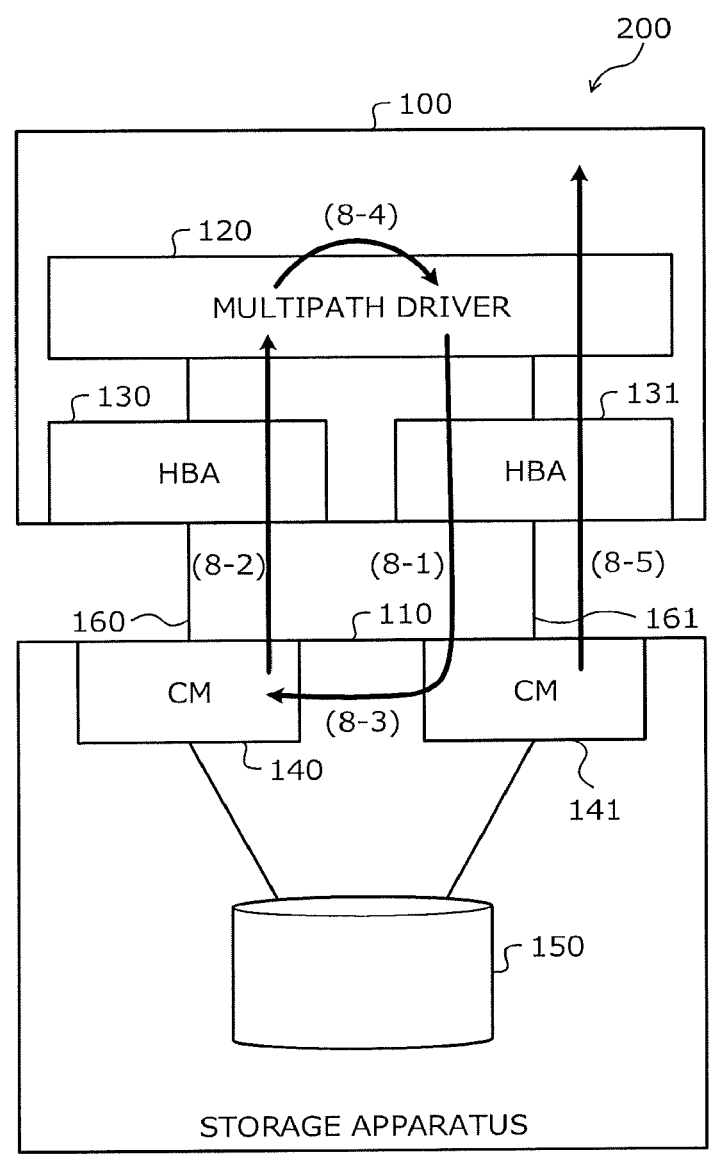
FIG. 8 is an explanatory diagram illustrating a concrete example of a first operation pattern in operation example 1.

Next, with reference to FIG. 8, description is given of a concrete example of the first operation pattern in operation example 1 illustrated in FIG. 7.

FIG. 8 is an explanatory diagram illustrating the concrete example of the first operation pattern in operation example 1. In the example of FIG. 8, it is assumed that the access control apparatus 100 replicates write data, if an access command is a command to write the write data into the storage device 150, and then outputs the access command to the CM 140 through the path 160.

(8-1) Since no response to the access command is received even after a predetermined time has passed since the output of the access command to the CM 140 through the path 160, the access control apparatus 100 outputs an access switch command to the CM 141 through the path 161.

(8-2) The access control apparatus 100 receives a normal response to the access command from the CM 140 through the path 160 before receiving a response to the access switch command. The access control apparatus 100 receives the normal response to the access command from the CM 140 through the path 160, but may set the path 160 to offline since the predetermined time has passed and there may be a failure in the path 160 or the CM 140.

Thus, the access control apparatus 100 may improve the reliability of the storage system 200 by not using the path 160 or the CM 140 with a possible failure. Moreover, the access control apparatus 100 may output the next access command through the path 161 and thus may reduce the time it takes to output the next access command.

(8-3) The CM 141 stops the processing by the CM 140 in response to the access switch command, and transmits a notification indicating that the processing by the CM 140 is stopped to the access control apparatus 100. The access control apparatus 100 receives the notification indicating that the processing by the CM 140 is stopped from the CM 141 through the path 161.

(8-4) The access control apparatus 100 outputs the access command to the CM 141 through the path 161, regardless of whether or not a response to the access command is received from the CM 140 through the path 160, since the processing by the CM 140 is stopped.

(8-5) The access control apparatus 100 receives a normal response to the access command from the CM 141 through the path 161. The access control apparatus 100 outputs the normal response to the request source of the access request since the normal response to the access command is received from the CM 140 and the normal response to the access command is received from the CM 141.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

Here, the description is given of the case where the access control apparatus 100 outputs the access command to the CM 141 through the path 161. However, the embodiment is not limited thereto. For example, the access control apparatus 100 receives the normal response to the access command from the CM 140 through the path 160, and thus may output the normal response to the request source of the access request without outputting the access command to the CM 141 through the path 161.

Here, the description is given of the case where the access control apparatus 100 sets the path 160 to offline. However, the embodiment is not limited thereto. For example, the access control apparatus 100 receives the normal response to the access command from the CM 140 through the path 160 without setting the path 160 to offline, and thus may output the normal response to the request source of the access request. In this case, the access control apparatus 100 does not have to perform the operations (8-3) to (8-5).

(Concrete Example of Second Operation Pattern in Operation Example 1)

Figure 9:
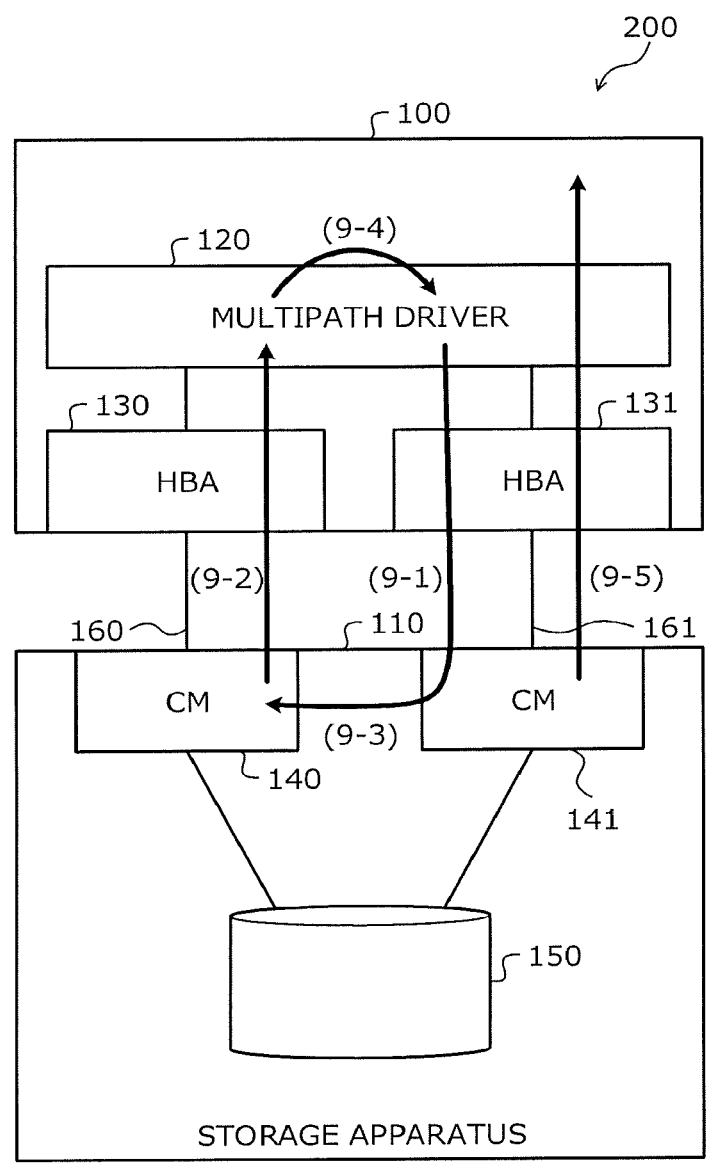
FIG. 9 is an explanatory diagram illustrating a concrete example of a second operation pattern in operation example 1.

Next, with reference to FIG. 9, description is given of a concrete example of the second operation pattern in operation example 1 illustrated in FIG. 7.

FIG. 9 is an explanatory diagram illustrating the concrete example of the second operation pattern in operation example 1. In the example of FIG. 9, it is assumed that the access control apparatus 100 replicates write data, if an access command is a command to write the write data into the storage device 150, and then outputs the access command to the CM 140 through the path 160.

(9-1) Since no response to the access command is received even after a predetermined time has passed since the output of the access command to the CM 140 through the path 160, the access control apparatus 100 outputs an access switch command to the CM 141 through the path 161.

(9-2) The access control apparatus 100 receives an error response to the access command from the CM 140 through the path 160 before receiving a response to the access switch command. The access control apparatus 100 receives the error response to the access command from the CM 140 through the path 160, and thus may set the path 160 to offline.

Thus, the access control apparatus 100 may improve the reliability of the storage system 200 by not using the path 160 or the CM 140 with a possible failure. Moreover, the access control apparatus 100 may output the next access command through the path 161 and thus may reduce the time it takes to output the next access command.

(9-3) The CM 141 stops the processing by the CM 140 in response to the access switch command, and transmits a notification indicating that the processing by the CM 140 is stopped to the access control apparatus 100. The access control apparatus 100 receives the notification indicating that the processing by the CM 140 is stopped from the CM 141 through the path 161.

(9-4) The access control apparatus 100 outputs the access command to the CM 141 through the path 161, regardless of whether or not a response to the access command is received from the CM 140 through the path 160, since the processing by the CM 140 is stopped.

(9-5) The access control apparatus 100 receives a normal response to the access command from the CM 141 through the path 161. The access control apparatus 100 outputs the normal response to the request source of the access request since the normal response to the access command is received from the CM 141.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

(Concrete Example of Third Operation Pattern in Operation Example 1)

Figure 10:
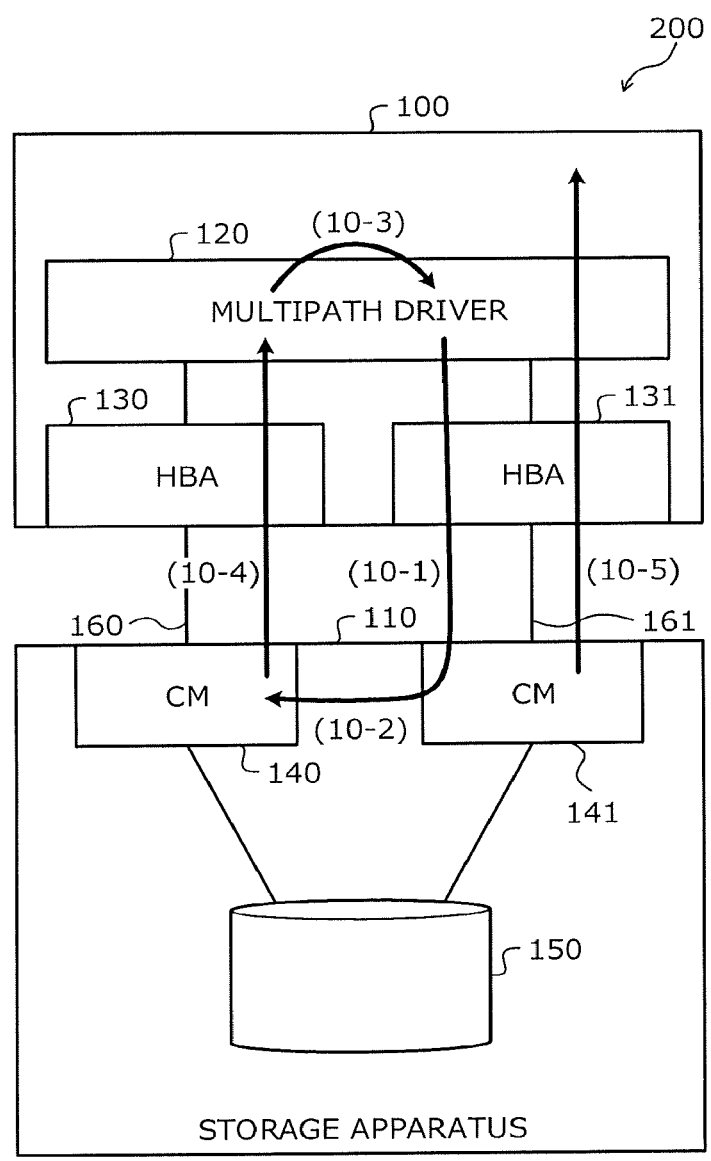
FIG. 10 is an explanatory diagram illustrating a concrete example of a third operation pattern in operation example 1.

Next, with reference to FIG. 10, description is given of a concrete example of the third operation pattern in operation example 1 illustrated in FIG. 7.

FIG. 10 is an explanatory diagram illustrating the concrete example of the third operation pattern in operation example 1. In the example of FIG. 10, it is assumed that the access control apparatus 100 replicates write data, if an access command is a command to write the write data into the storage device 150, and then outputs the access command to the CM 140 through the path 160.

(10-1) Since no response to the access request is received even after a predetermined time has passed since the output of the access command to the CM 140 through the path 160, the access control apparatus 100 outputs an access switch command to the CM 141 through the path 161.

(10-2) The CM 141 stops the processing by the CM 140 in response to the access switch command, and transmits a notification indicating that the processing by the CM 140 is stopped to the access control apparatus 100. Alternatively, since the processing by the CM 140 is already stopped when there is a failure in the CM 140, the CM 141 may transmit a notification indicating that the processing by the CM 140 is stopped to the access control apparatus 100. The access control apparatus 100 receives the notification indicating that the processing by the CM 140 is stopped from the CM 141 through the path 161.

(10-3) The access control apparatus 100 outputs the access command to the CM 141 through the path 161, regardless of whether or not a response to the access command is received from the CM 140 through the path 160, since the processing by the CM 140 is stopped.

(10-4) The access control apparatus 100 receives an error response due to the fact that the processing by the CM 140 is stopped by the CM 141 from the CM 140 through the path 160. The access control apparatus 100 receives an error response to the access command from the HBA 130, since there is no response from the CM 140 through the path 160, when there is a failure in the CM 140 or the path 160. Here, the access control apparatus 100 may set the path 160 to offline.

Thus, the access control apparatus 100 may improve the reliability of the storage system 200 by not using the path 160 or the CM 140 with a possible failure. Moreover, the access control apparatus 100 may output the next access command through the path 161 and thus may reduce the time it takes to output the next access command.

(10-5) The access control apparatus 100 receives a normal response to the access command from the CM 141 through the path 161. The access control apparatus 100 outputs the normal response to the request source of the access request since the normal response to the access command is received from the CM 141.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

Here, the description is given of the case where the access control apparatus 100 performs the operation of (10-4) after the operation of (10-3). However, the embodiment is not limited thereto. For example, the access control apparatus 100 may perform the operation of (10-3) after the operation of (10-4).

(Concrete Example of Fourth Operation Pattern in Operation Example 1)

Figure 11:
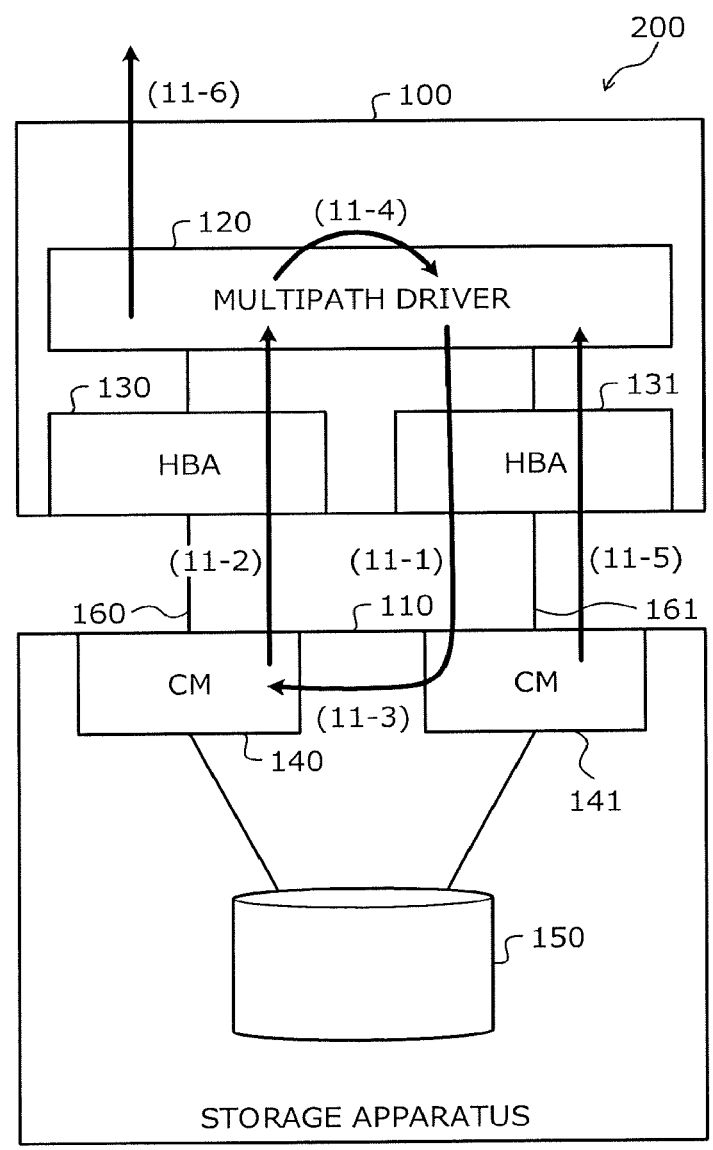
FIG. 11 is an explanatory diagram illustrating a concrete example of a fourth operation pattern in operation example 1.

Next, with reference to FIG. 11, description is given of a concrete example of the fourth operation pattern in operation example 1 illustrated in FIG. 7.

FIG. 11 is an explanatory diagram illustrating the concrete example of the fourth operation pattern in operation example 1. In the example of FIG. 11, it is assumed that the access control apparatus 100 replicates write data, if an access command is a command to write the write data into the storage device 150, and then outputs the access command to the CM 140 through the path 160.

(11-1) Since no response to the access command is received even after a predetermined time has passed since the output of the access command to the CM 140 through the path 160, the access control apparatus 100 outputs an access switch command to the CM 141 through the path 161.

(11-2) The access control apparatus 100 receives a normal response to the access command from the CM 140 through the path 160 before receiving a response to the access switch command. The access control apparatus 100 receives the normal response to the access command from the CM 140 through the path 160, but may set the path 160 to offline since the predetermined time has passed and there may be a failure in the path 160 or the CM 140. Thus, the access control apparatus 100 may improve the reliability of the storage system 200 by not using the path 160 or the CM 140 with a possible failure.

(11-3) The CM 141 stops the processing by the CM 140 in response to the access switch command, and transmits a notification indicating that the processing by the CM 140 is stopped to the access control apparatus 100. The access control apparatus 100 receives the notification indicating that the processing by the CM 140 is stopped from the CM 141 through the path 161.

(11-4) The access control apparatus 100 outputs the access command to the CM 141 through the path 161, regardless of whether or not a response to the access command is received from the CM 140 through the path 160, since the processing by the CM 140 is stopped.

(11-5) The access control apparatus 100 receives an error response to the access command from the CM 141 through the path 161. The access control apparatus 100 outputs the normal response to the request source of the access request since the normal response to the access command is received from the CM 140.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

Here, the description is given of the case where the access control apparatus 100 outputs the access command to the CM 141 through the path 161. However, the embodiment is not limited thereto. For example, the access control apparatus 100 receives the normal response to the access command from the CM 140 through the path 160, and thus may output the normal response to the request source of the access request without outputting the access command to the CM 141 through the path 161.

(Concrete Example of Fifth Operation Pattern in Operation Example 1)

Figure 12:
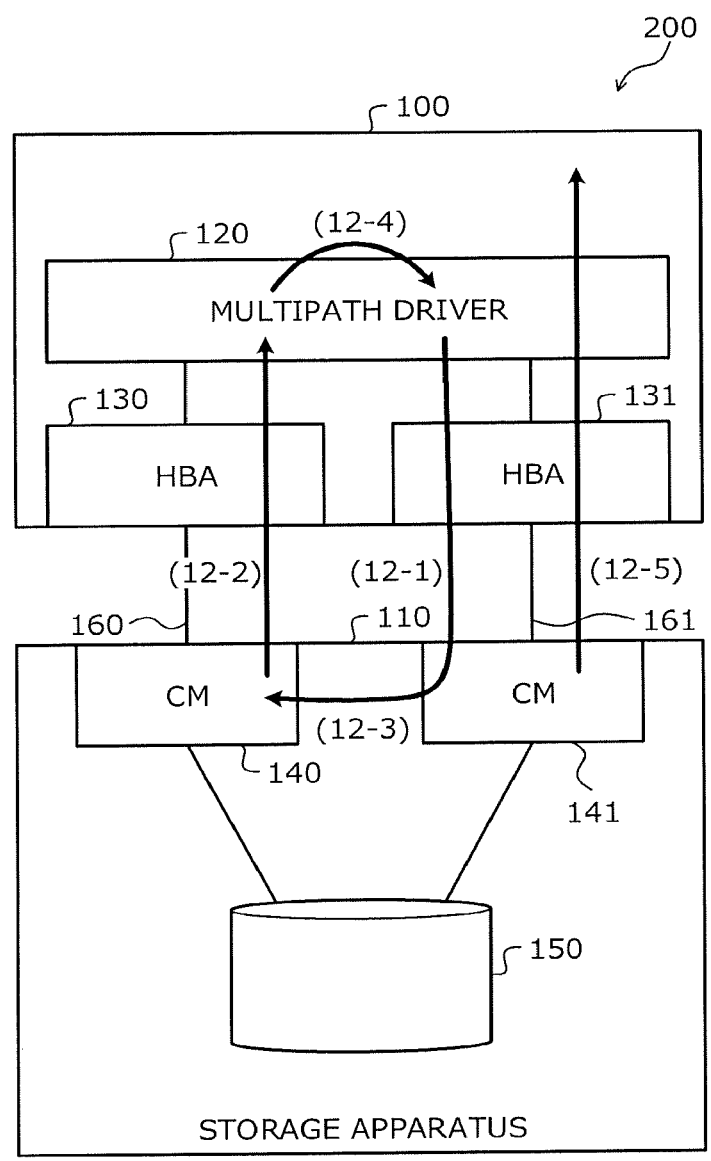
FIG. 12 is an explanatory diagram illustrating a concrete example of a fifth operation pattern in operation example 1.

Next, with reference to FIG. 12, description is given of a concrete example of the fifth operation pattern in operation example 1 illustrated in FIG. 7.

FIG. 12 is an explanatory diagram illustrating the concrete example of the fifth operation pattern in operation example 1. In the example of FIG. 12, it is assumed that the access control apparatus 100 replicates write data, if an access command is a command to write the write data into the storage device 150, and then outputs the access command to the CM 140 through the path 160.

(12-1) Since no response to the access command is received even after a predetermined time has passed since the output of the access command to the CM 140 through the path 160, the access control apparatus 100 outputs an access switch command to the CM 141 through the path 161.

(12-2) The access control apparatus 100 receives an error response to the access command from the CM 140 through the path 160 before receiving a response to the access switch command.

(12-3) The CM 141 stops the processing by the CM 140 in response to the access switch command, and transmits a notification indicating that the processing by the CM 140 is stopped to the access control apparatus 100. The access control apparatus 100 receives the notification indicating that the processing by the CM 140 is stopped from the CM 141 through the path 161.

(12-4) The access control apparatus 100 outputs the access command to the CM 141 through the path 161, regardless of whether or not a response to the access command is received from the CM 140 through the path 160, since the processing by the CM 140 is stopped.

(12-5) The access control apparatus 100 receives an error response to the access command from the CM 141 through the path 161. The access control apparatus 100 outputs the error response to the request source of the access request since the error response to the access command is received from the CM 140 and the error response to the access command is received from the CM 141.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

(Concrete Example of Sixth Operation Pattern in Operation Example 1)

Figure 13:
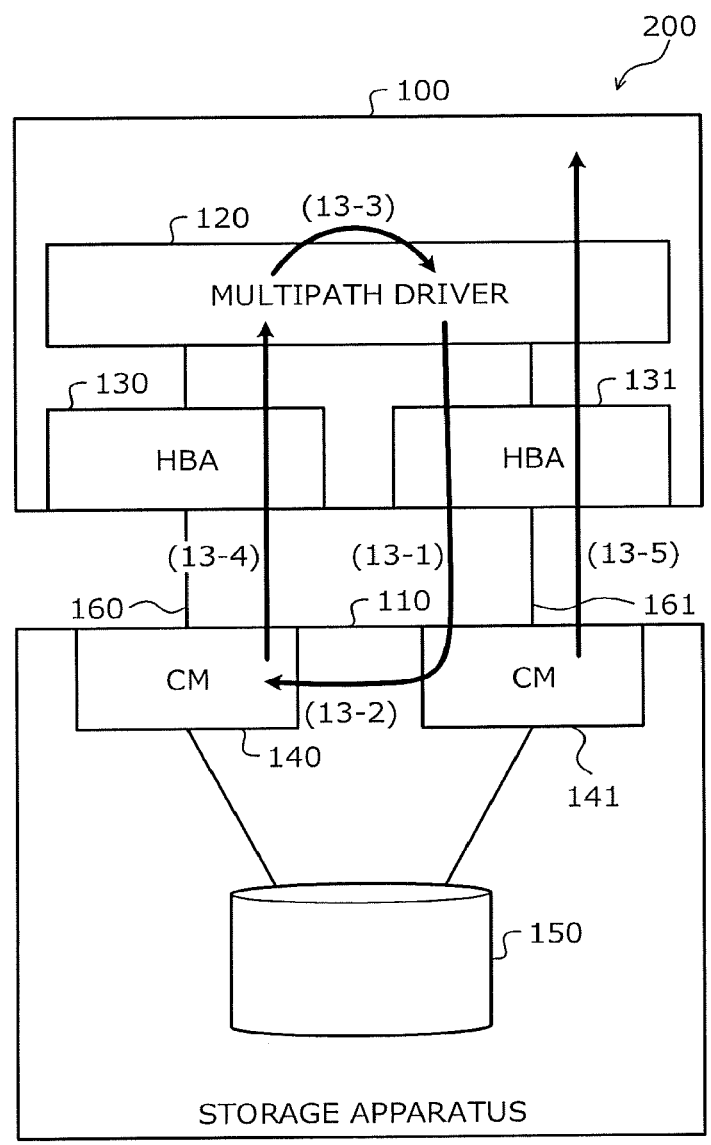
FIG. 13 is an explanatory diagram illustrating a concrete example of a sixth operation pattern in operation example 1.

Next, with reference to FIG. 13, description is given of a concrete example of the sixth operation pattern in operation example 1 illustrated in FIG. 7.

FIG. 13 is an explanatory diagram illustrating the concrete example of the sixth operation pattern in operation example 1. In the example of FIG. 13, it is assumed that the access control apparatus 100 replicates write data, if an access command is a command to write the write data into the storage device 150, and then outputs the access command to the CM 140 through the path 160.

(13-1) Since no response to the access request is received even after a predetermined time has passed since the output of the access command to the CM 140 through the path 160, the access control apparatus 100 outputs an access switch command to the CM 141 through the path 161.

(13-2) The CM 141 stops the processing by the CM 140 in response to the access switch command, and transmits a notification indicating that the processing by the CM 140 is stopped to the access control apparatus 100. Alternatively, since the processing by the CM 140 is already stopped when there is a failure in the CM 140, the CM 141 may transmit a notification indicating that the processing by the CM 140 is stopped to the access control apparatus 100. The access control apparatus 100 receives the notification indicating that the processing by the CM 140 is stopped from the CM 141 through the path 161.

(13-3) The access control apparatus 100 outputs the access command to the CM 141 through the path 161, regardless of whether or not a response to the access command is received from the CM 140 through the path 160, since the processing by the CM 140 is stopped.

(13-4) The access control apparatus 100 receives an error response to the access command, due to the fact that the processing by the CM 140 is stopped by the CM 141, from the CM 140 through the path 160. The access control apparatus 100 receives an error response to the access command from the HBA 130, since there is no response from the CM 140 through the path 160, when there is a failure in the CM 140 or the path 160.

(13-5) The access control apparatus 100 receives an error response to the access command from the CM 141 through the path 161. The access control apparatus 100 outputs the error response to the request source of the access request since the error response to the access command is received from the CM 140 and the error response to the access command is received from the CM 141.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

Here, the description is given of the case where the access control apparatus 100 performs the operation of (13-4) after the operation of (13-3). However, the embodiment is not limited thereto. For example, the access control apparatus 100 may perform the operation of (13-3) after the operation of (13-4).

(Concrete Example of Seventh Operation Pattern in Operation Example 1)

Figure 14:
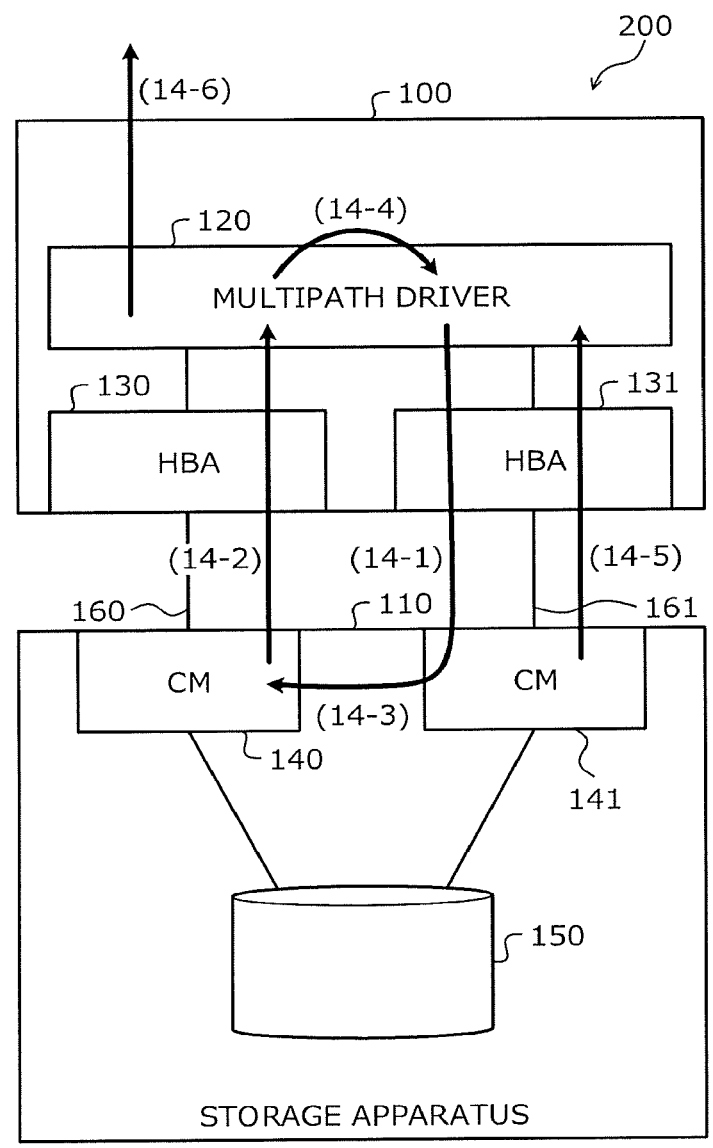
FIG. 14 is an explanatory diagram illustrating a concrete example of a seventh operation pattern in operation example 1.

Next, with reference to FIG. 14, description is given of a concrete example of the seventh operation pattern in operation example 1 illustrated in FIG. 7.

FIG. 14 is an explanatory diagram illustrating the concrete example of the seventh operation pattern in operation example 1. In the example of FIG. 14, it is assumed that the access control apparatus 100 replicates write data, if an access command is a command to write the write data into the storage device 150, and then outputs the access command to the CM 140 through the path 160.

(14-1) Since no response to the access command is received even after a predetermined time has passed since the output of the access command to the CM 140 through the path 160, the access control apparatus 100 outputs an access switch command to the CM 141 through the path 161.

(14-2) The access control apparatus 100 receives a normal response to the access command from the CM 140 through the path 160 before receiving a response to the access switch command. The access control apparatus 100 receives the normal response to the access command from the CM 140 through the path 160, but may set the path 160 to offline since the predetermined time has passed and there may be a failure in the path 160 or the CM 140. Thus, the access control apparatus 100 may improve the reliability of the storage system 200 by not using the path 160 or the CM 140 with a possible failure.

(14-3) The CM 141 stops the processing by the CM 140 in response to the access switch command, and transmits a notification indicating that the processing by the CM 140 is stopped to the access control apparatus 100. The access control apparatus 100 receives the notification indicating that the processing by the CM 140 is stopped from the CM 141 through the path 161.

(14-4) The access control apparatus 100 outputs the access command to the CM 141 through the path 161, regardless of whether or not a response to the access command is received from the CM 140 through the path 160, since the processing by the CM 140 is stopped.

(14-5) The access control apparatus 100 receives an error response to the access command from the HBA 131 since the HBA 131 determines that there is no response from the CM 141 through the path 161. The access control apparatus 100 may set the path 161 to offline since the error response to the access command is received from the HBA 131. Thus, the access control apparatus 100 may improve the reliability of the storage system 200 by not using the path 161 or the CM 141 with a possible failure.

(14-6) The access control apparatus 100 outputs the normal response to the request source of the access request since the normal response to the access command is received from the CM 140.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

Here, the description is given of the case where the access control apparatus 100 outputs the access command to the CM 141 through the path 161. However, the embodiment is not limited thereto. For example, the access control apparatus 100 receives the normal response to the access command from the CM 140 through the path 160, and thus may output the normal response to the request source of the access request without outputting the access command to the CM 141 through the path 161. In this case, the mirroring is not canceled by the mirror software 230 in the access control apparatus 100.

Here, the description is given of the case where the access control apparatus 100 sets the path 160 to offline. However, the embodiment is not limited thereto. For example, the access control apparatus 100 receives the normal response to the access command from the CM 140 through the path 160 without setting the path 160 to offline, and thus may output the normal response to the request source of the access request. In this case, the access control apparatus 100 does not have to perform the operations (14-3) to (14-5).

(Concrete Example of Eighth Operation Pattern in Operation Example 1)

Figure 15:
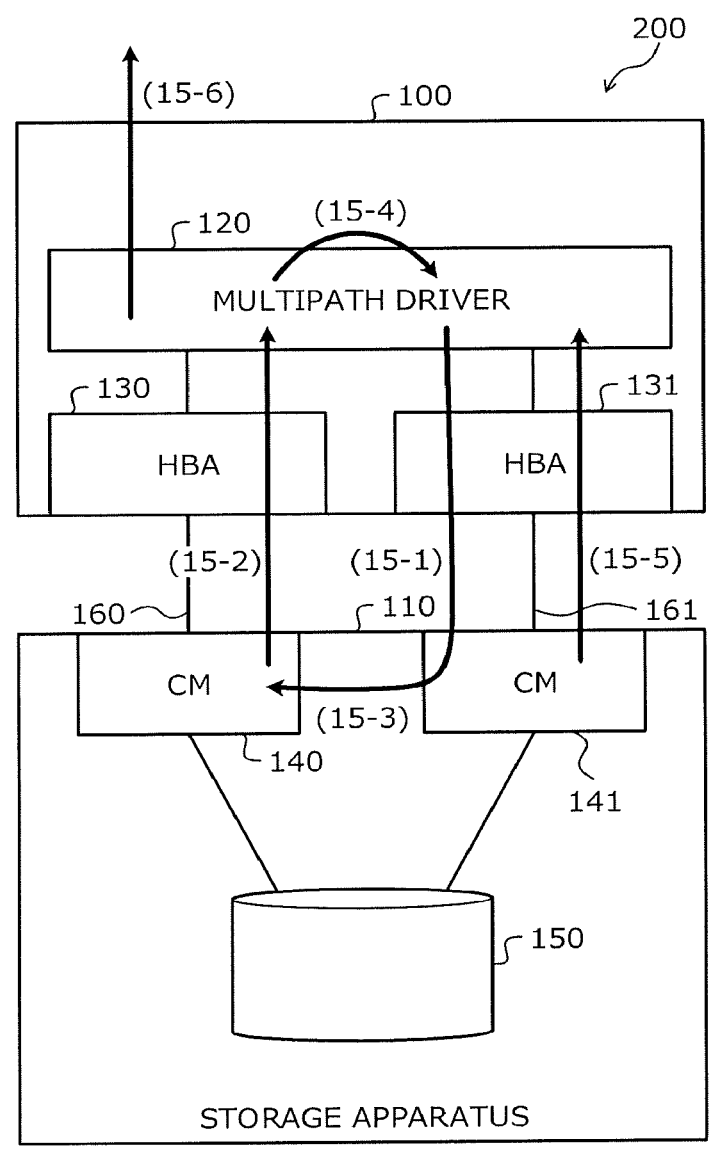
FIG. 15 is an explanatory diagram illustrating a concrete example of an eighth operation pattern in operation example 1.

Next, with reference to FIG. 15, description is given of a concrete example of the eighth operation pattern in operation example 1 illustrated in FIG. 7.

FIG. 15 is an explanatory diagram illustrating the concrete example of the eighth operation pattern in operation example 1. In the example of FIG. 15, it is assumed that the access control apparatus 100 replicates write data, if an access command is a command to write the write data into the storage device 150, and then outputs the access command to the CM 140 through the path 160.

(15-1) Since no response to the access command is received even after a predetermined time has passed since the output of the access command to the CM 140 through the path 160, the access control apparatus 100 outputs an access switch command to the CM 141 through the path 161.

(15-2) The access control apparatus 100 receives an error response to the access command from the CM 140 through the path 160 before receiving a response to the access switch command.

(15-3) The CM 141 stops the processing by the CM 140 in response to the access switch command, and transmits a notification indicating that the processing by the CM 140 is stopped to the access control apparatus 100. The access control apparatus 100 receives the notification indicating that the processing by the CM 140 is stopped from the CM 141 through the path 161.

(15-4) The access control apparatus 100 outputs the access command to the CM 141 through the path 161, regardless of whether or not a response to the access command is received from the CM 140 through the path 160, since the processing by the CM 140 is stopped.

(15-5) The access control apparatus 100 receives an error response to the access command from the HBA 131 since the HBA 131 determines that there is no response from the CM 141 through the path 161. The access control apparatus 100 may set the path 161 to offline since the error response to the access command is received from the HBA 131. Thus, the access control apparatus 100 may improve the reliability of the storage system 200 by not using the path 161 or the CM 141 with a possible failure.

(15-6) The access control apparatus 100 outputs the error response to the request source of the access request since the error response to the access command is received from the CM 140 and the error response to the access command is received from the HBA 131.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

(Concrete Example of Ninth Operation Pattern in Operation Example 1)

Figure 16:
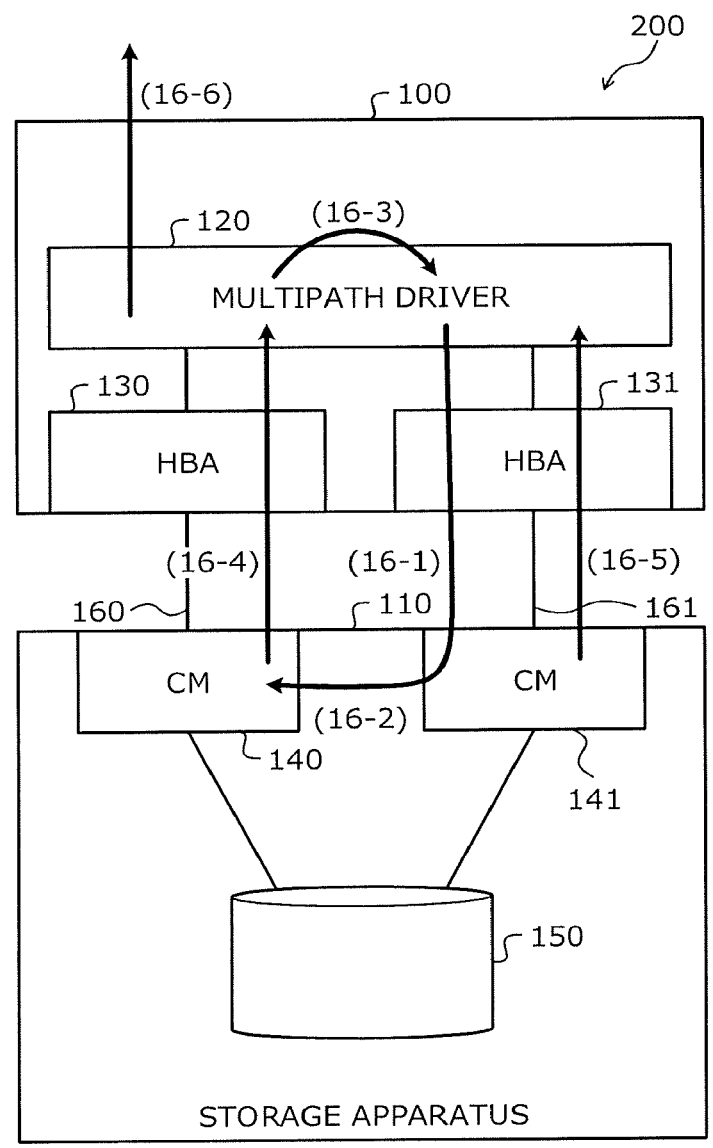
FIG. 16 is an explanatory diagram illustrating a concrete example of a ninth operation pattern in operation example 1.

Next, with reference to FIG. 16, description is given of a concrete example of the ninth operation pattern in operation example 1 illustrated in FIG. 7.

FIG. 16 is an explanatory diagram illustrating the concrete example of the ninth operation pattern in operation example 1. In the example of FIG. 16, it is assumed that the access control apparatus 100 replicates write data, if an access command is a command to write the write data into the storage device 150, and then outputs the access command to the CM 140 through the path 160.

(16-1) Since no response to the access command is received even after a predetermined time has passed since the output of the access command to the CM 140 through the path 160, the access control apparatus 100 outputs an access switch command to the CM 141 through the path 161.

(16-2) The CM 141 stops the processing by the CM 140 in response to the access switch command, and transmits a notification indicating that the processing by the CM 140 is stopped to the access control apparatus 100. Alternatively, since the processing by the CM 140 is already stopped when there is a failure in the CM 140, the CM 141 may transmit a notification indicating that the processing by the CM 140 is stopped to the access control apparatus 100. The access control apparatus 100 receives the notification indicating that the processing by the CM 140 is stopped from the CM 141 through the path 161.

(16-3) The access control apparatus 100 outputs the access command to the CM 141 through the path 161, regardless of whether or not a response to the access command is received from the CM 140 through the path 160, since the processing by the CM 140 is stopped.

(16-4) The access control apparatus 100 receives an error response to the access command, due to the fact that the processing by the CM 140 is stopped by the CM 141, from the CM 140 through the path 160. The access control apparatus 100 receives an error response to the access command from the HBA 130, since there is no response from the CM 140 through the path 160, when there is a failure in the CM 140 or the path 160.

(16-5) The access control apparatus 100 receives an error response to the access command from the HBA 131 since the HBA 131 determines that there is no response from the CM 141 through the path 161. The access control apparatus 100 may set the path 161 to offline since the error response to the access command is received from the CM 141 through the path 161. Thus, the access control apparatus 100 may improve the reliability of the storage system 200 by not using the path 161 or the CM 141 with a possible failure.

(16-6) The access control apparatus 100 outputs the error response to the request source of the access request since the error response to the access command is received from the CM 140 and the error response to the access command is received from the HBA 131.

Therefore, the access control apparatus 100 may output the access command to the CM 141 through the path 161 while reducing the destruction of data with the access switch command without waiting for a response to the access command from the CM 140 through the path 160. Thus, the access control apparatus 100 may reduce the time it takes to execute the access by reducing the time it takes to wait for the response to the access command from the CM 140 through the path 160, and may suppress an increase in time it takes to respond to the request source of the access request.

Here, the description is given of the case where the access control apparatus 100 performs the operation of (16-4) after the operation of (16-3). However, the embodiment is not limited thereto. For example, the access control apparatus 100 may perform the operation of (16-3) after the operation of (16-4).

(Example of Initialization Procedure According to Operation Example 1)

Figure 17:
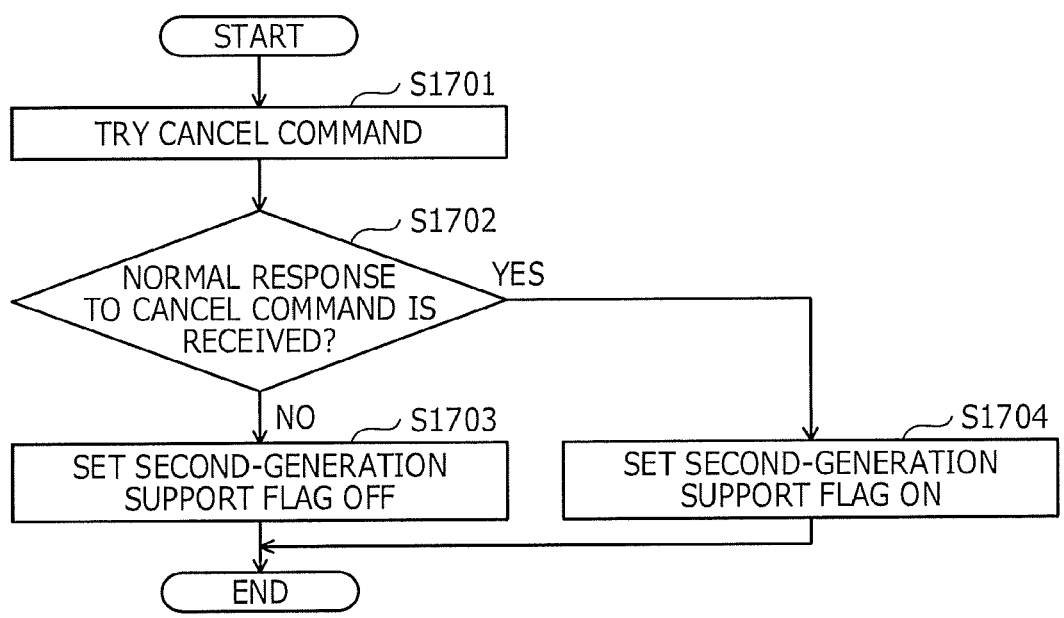
FIG. 17 is a flowchart illustrating an example of an initialization procedure according to operation example 1.

Next, with reference to FIG. 17, description is given of an example of an initialization procedure according to operation example 1.

FIG. 17 is a flowchart illustrating an example of the initialization procedure according to operation example 1. In FIG. 17, the access control apparatus 100 tries a cancel command (Step S1701). Next, the access control apparatus 100 determines whether or not there is a normal response to the cancel command (Step S1702). Here, when there is no normal response to the cancel command (Step S1702: No), the access control apparatus 100 sets a second-generation support flag off (Step S1703) and then terminates the initialization processing.

On the other hand, when there is a normal response to the cancel command (Step S1702: Yes), the access control apparatus 100 sets the second-generation support flag on (Step S1704) and then terminates the initialization processing.

(Example of Access Processing Procedure According to Operation Example 1)

Figure 18:
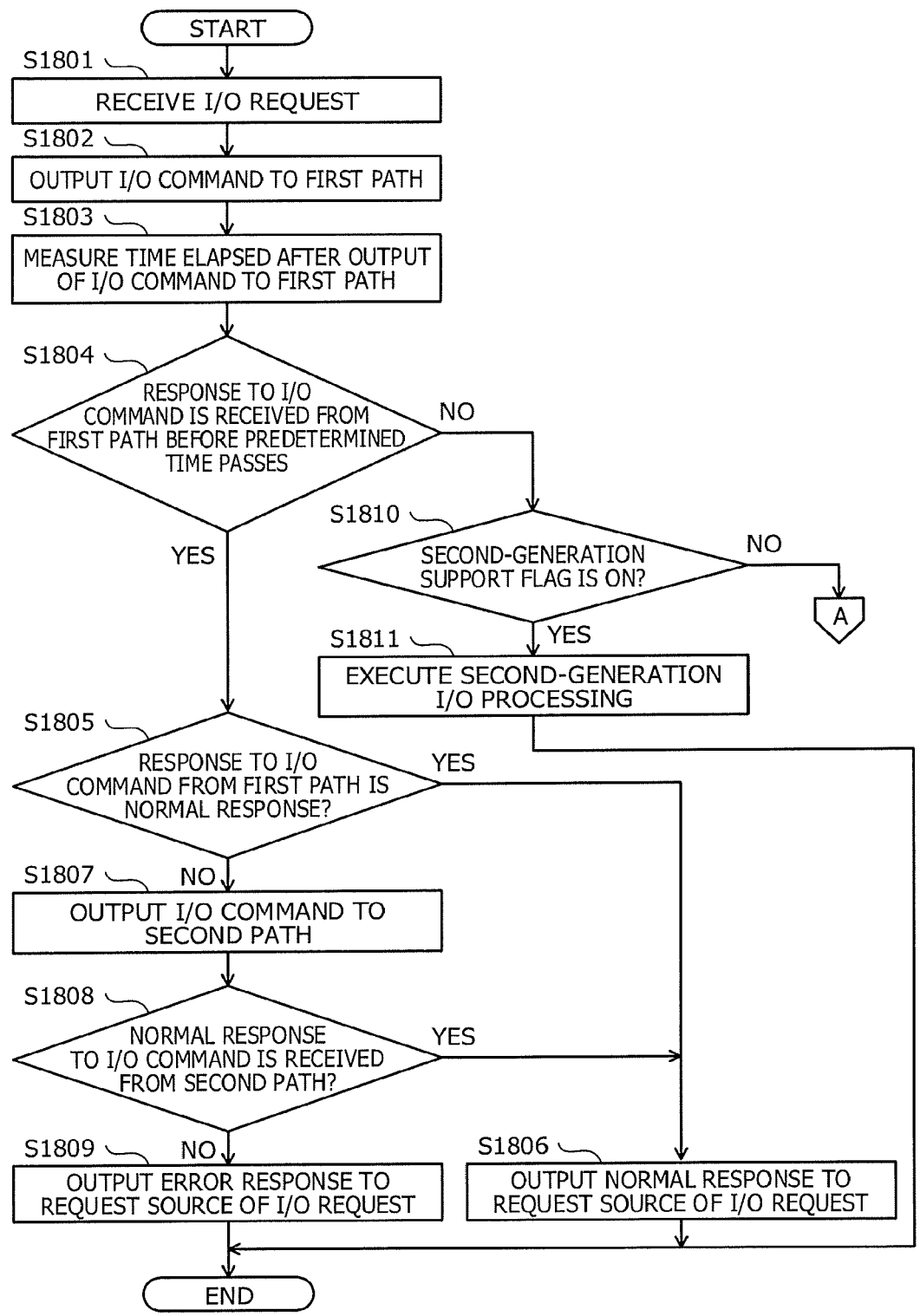
FIG. 18 is a flowchart (Part 1) illustrating an example of an access processing procedure according to operation example 1.
Figure 19:
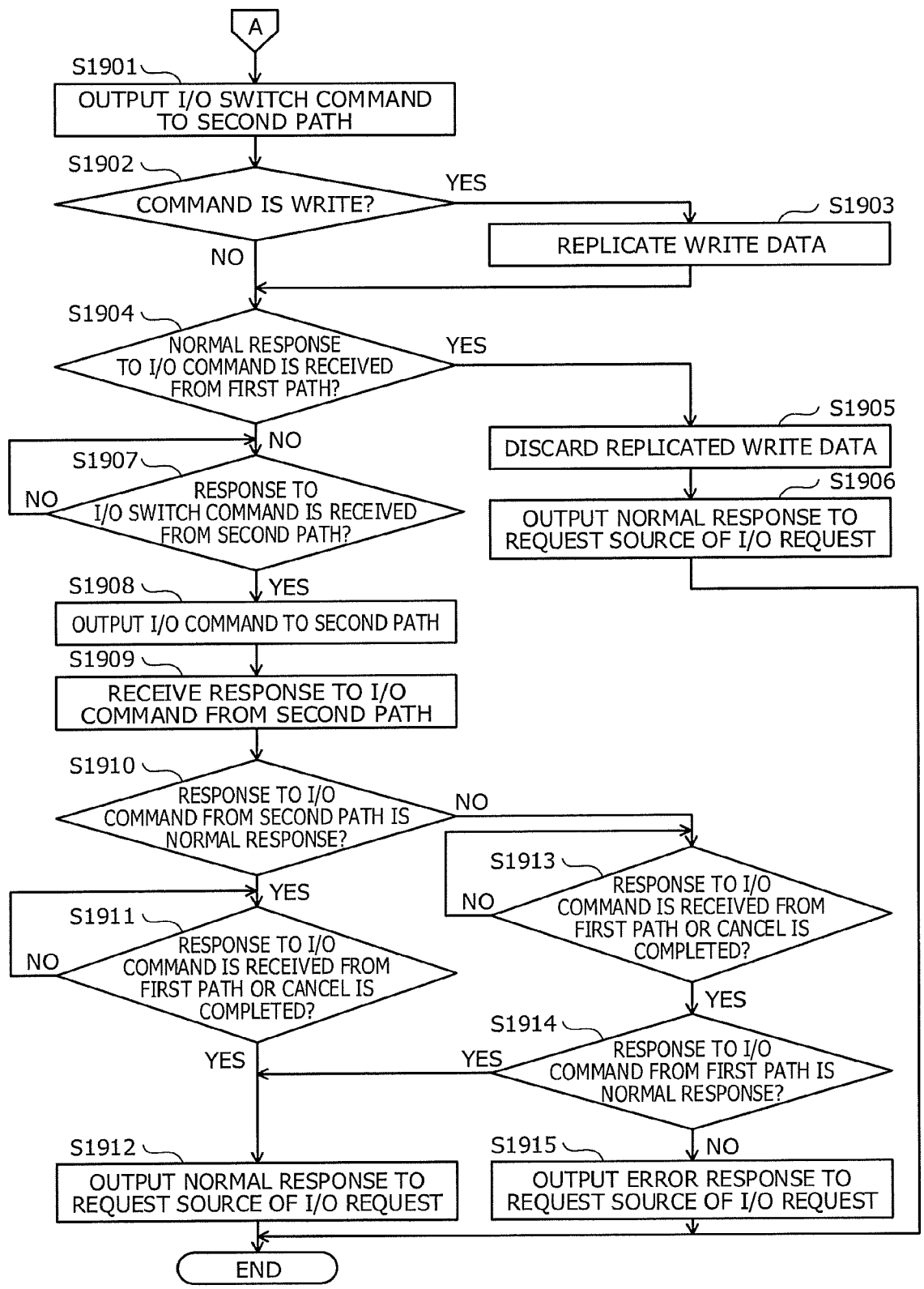
FIG. 19 is a flowchart (Part 2) illustrating an example of the access processing procedure according to operation example 1.

Next, with reference to FIGS. 18 and 19, description is given of an example of an access processing procedure according to operation example 1.

FIGS. 18 and 19 are flowcharts each illustrating an example of the access processing procedure according to operation example 1. In FIG. 18, the access control apparatus 100 receives an access request (Step S1801). The access control apparatus 100 outputs an access command to a first path (Step S1802). Then, the access control apparatus 100 measures a time elapsed after outputting the access command to the first path (Step S1803).

The access control apparatus 100 determines whether or not there is a response to the access command from the first path before a predetermined time passes after the output of the access command to the first path (Step S1804). Here, when there is a response to the access command from the first path (Step S1804: Yes), the access control apparatus 100 determines whether or not the response to the access command from the first path is a normal response (Step S1805). Here, when the response is the normal response (Step S1805: Yes), the access control apparatus 100 outputs the normal response to the request source of the access request (Step S1806) and then terminates the access processing.

On the other hand, when the response is not the normal response (Step S1805: No), the access control apparatus 100 outputs an access command to a second path (Step S1807).

Next, the access control apparatus 100 determines whether or not there is a normal response to the access command from the second path (Step S1808). Here, when there is a normal response to the access command from the second path (Step S1808: Yes), the access control apparatus 100 moves to the processing of Step S1806.

On the other hand, when there is no normal response to the access command from the second path (Step S1808: No), the access control apparatus 100 outputs an error response to the request source of the access request (Step S1809) and then terminates the access processing.

Meanwhile, when there is no response to the access command from the first path in Step S1804 (Step S1804: No), the access control apparatus 100 determines whether or not the second-generation support flag is on (Step S1810). Here, when the second-generation support flag is on (Step S1810: Yes), the access control apparatus 100 executes second-generation access processing (Step S1811) and then terminates the access processing.

On the other hand, when the second-generation support flag is off (Step S1810: No), the access control apparatus 100 moves to processing of Step S1901 in FIG. 19.

In FIG. 19, the access control apparatus 100 outputs an access switch command with wwn of the first path and information indicating the CM set as an argument to the second path (Step S1901). Next, the access control apparatus 100 determines whether or not the command is a write command (Step S1902). Here, when the command is the write command (Step S1902: Yes), the access control apparatus 100 replicates write data (Step S1903) and then moves to processing of Step S1904.

On the other hand, when the command is not the write command (Step S1902: No), the access control apparatus 100 determines whether or not there is a normal response to the access command from the first path (Step S1904). When there is a normal response to the access command from the first path (Step S1904: Yes), the access control apparatus 100 discards the replicated write data (Step S1905). Thereafter, the access control apparatus 100 outputs the normal response to the request source of the access request (Step S1906) and then terminates the access processing.

Meanwhile, when there is no normal response to the access command from the first path (Step S1904: No), the access control apparatus 100 determines whether or not there is a response to the access switch command from the second path (Step S1907). Here, when there is no response to the access switch command from the second path (Step S1907: No), the access control apparatus 100 returns to the processing of Step S1907.

On the other hand, when there is a response to the access switch command from the second path (Step S1907: Yes), the access control apparatus 100 outputs an access command to the second path (Step S1908). Then, the access control apparatus 100 receives a response to the access command from the second path (Step S1909).

Thereafter, the access control apparatus 100 determines whether or not the response to the access command from the second path is a normal response (Step S1910). Here, when the response is the normal response (Step S1910: Yes), the access control apparatus 100 determines whether or not there is a response to the access command from the first path or the cancel is completed (Step S1911). Here, when there is no response to the access command from the first path and the cancel is not completed (Step S1911: No), the access control apparatus 100 returns to the processing of Step S1911.

On the other hand, when there is a response to the access command from the first path or the cancel is completed (Step S1911: Yes), the access control apparatus 100 outputs a normal response to the request source of the access request (Step S1912) and then terminates the access processing.

Meanwhile, when the response is not the normal response in Step S1910 (Step S1910: No), the access control apparatus 100 determines whether or not there is a response to the access command from the first path or the cancel is completed (Step S1913). Here, when there is no response to the access command from the first path and the cancel is not completed (Step S1913: No), the access control apparatus 100 returns to the processing of Step S1913.

On the other hand, when there is a response to the access command from the first path or the cancel is completed (Step S1913: Yes), the access control apparatus 100 determines whether or not the response to the access command from the first path is a normal response (Step S1914). Here, when the response is not the normal response (Step S1914: No), the access control apparatus 100 outputs an error response to the request source of the access request (Step S1915) and then terminates the access processing.

On the other hand, when the response is the normal response (Step S1914: Yes), the access control apparatus 100 moves to the processing of Step S1912.

(Example of Cancellation Procedure According to Operation Example 1)

Figure 20:
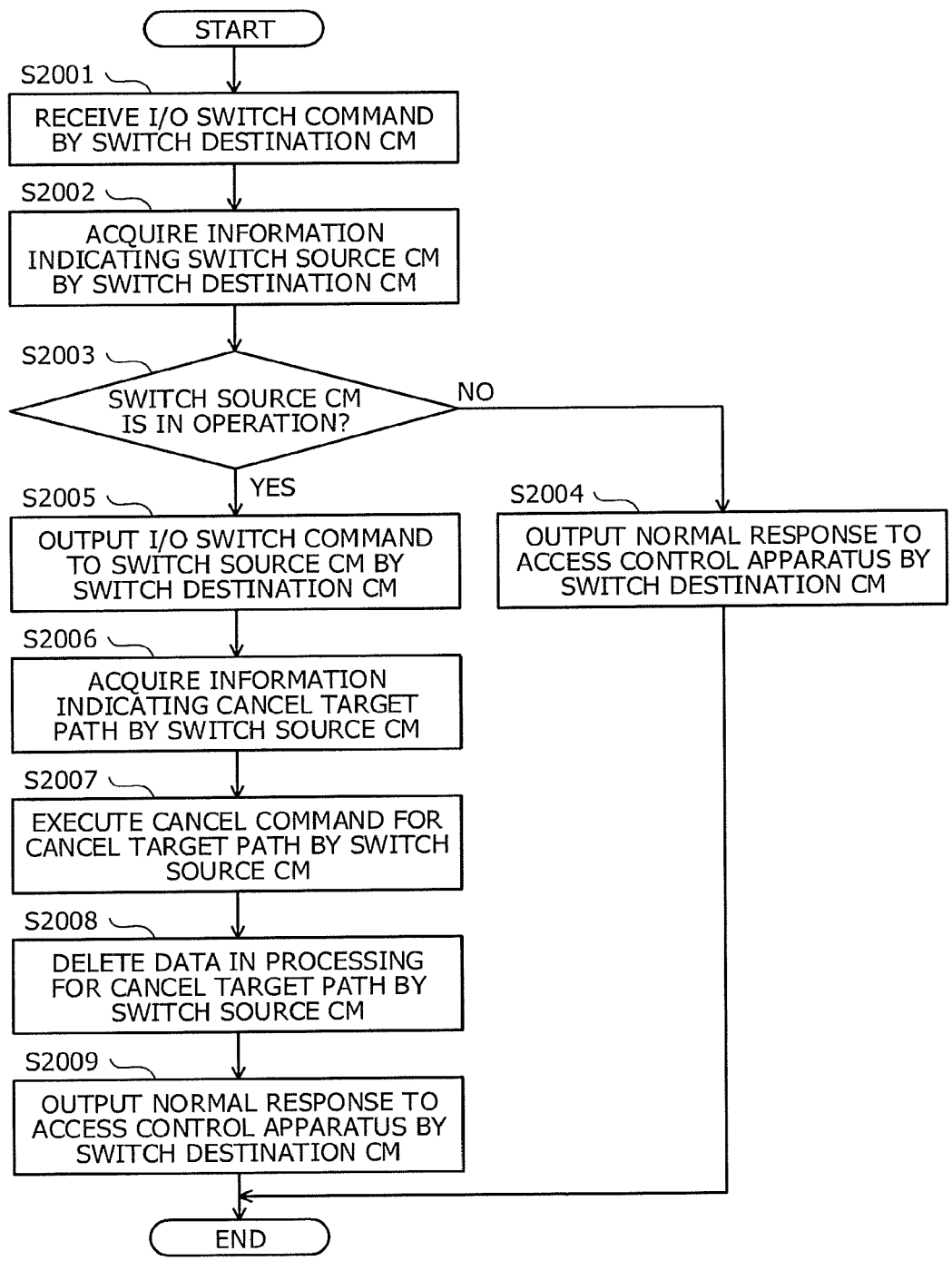
FIG. 20 is a flowchart illustrating an example of a cancellation procedure according to operation example 1.

Next, with reference to FIG. 20, description is given of an example of a cancellation procedure according to operation example 1.

FIG. 20 is a flowchart illustrating an example of the cancellation procedure according to operation example 1. In FIG. 20, the storage apparatus 110 receives an access switch command through a switch destination CM (Step S2001). Then, the storage apparatus 110 acquires information indicating a switch source CM, based on the argument of the access switch command, through the switch destination CM (Step S2002).

Thereafter, the storage apparatus 110 determines, through the switch destination CM, whether or not the switch source CM is in operation (Step S2003). Here, when the switch source CM is not in operation (Step S2003: No), the storage apparatus 110 outputs a normal response to the access control apparatus 100 through the switch destination CM (Step S2004) and then terminates the cancellation processing.

On the other hand, when the switch source CM is in operation (Step S2003: Yes), the storage apparatus 110 outputs an access switch command to the switch source CM through the switch destination CM (Step S2005). Then, the storage apparatus 110 acquires, through the switch source CM, information indicating a cancel target path from the argument of the access switch command (Step S2006). Thereafter, the storage apparatus 110 executes a cancel command for the cancel target path through the switch source CM (Step S2007).

Next, the storage apparatus 110 deletes data in processing for the cancel target path, through the switch source CM, and outputs the deletion to the switch destination CM (Step S2008). Then, the storage apparatus 110 outputs a normal response to the access control apparatus 100 through the switch destination CM (Step S2009) and then terminates the cancellation processing.

(Operation Example 2 of Access Control Apparatus 100)

Next, operation example 2 of the access control apparatus 100 is described. As described above, operation Example 1 is the example where the HBA 131 may output an access command even before a response to the access command is received after an access command is outputted from the HBA 130. On the other hand, operation example 2 is an example where an access command is outputted from the HBA 131 after an access command is outputted from the HBA 130 and then a response to the access command is received. According to operation example, the access control apparatus 100 does not have to replicate data.

(Example of Plurality of Operation Patterns in Operation Example 2)

Figure 21:
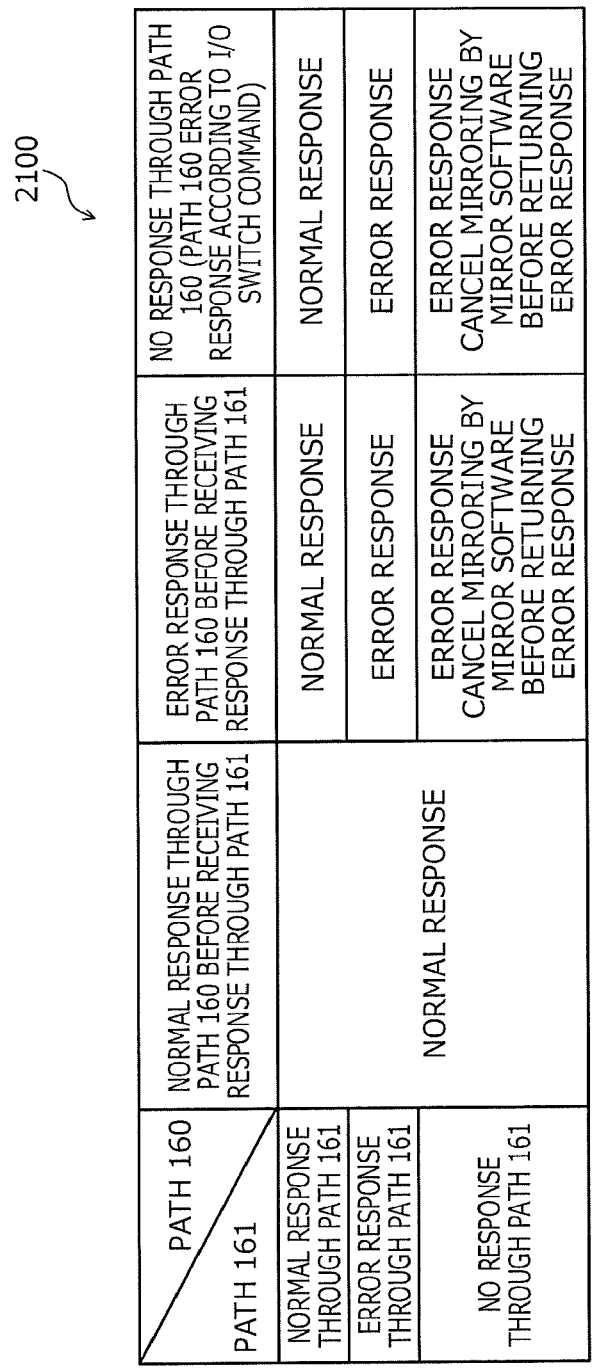
FIG. 21 is an explanatory diagram illustrating an example of a plurality of operation patterns in operation example 2.

First, with reference to FIG. 21, description is given of an example of a plurality of operation patterns in operation example 2.

FIG. 21 is an explanatory diagram illustrating an example of a plurality of operation patterns in operation example 2. As described above, upon receipt of an access request to the storage device 150, the access control apparatus 100 outputs an access command to the storage device 150 through the path 160 through which the HBA 130 is coupled to the CM 140.

Then, the access control apparatus 100 determines whether or not a response to the access command is received before a predetermined time passes after the output of the access command to the CM 140 through the path 160. Upon receipt of no response to the access command even after the predetermined time has passed, the access control apparatus 100 outputs an access switch command to allow the CM 141 to stop processing executed by the CM 140 according to the access command, through the path 161.

Thereafter, when the response to the access command is received from the CM 140 and the processing executed by the CM 140 according to the access command is stopped, the access control apparatus 100 outputs an access command through the path 161 and receives a response to the access command from the CM 141.

Here, the operation pattern of the access control apparatus 100 varies depending on the kind of the response received through the path 160, the kind of the response received through the path 161, and the order of receiving the responses through the path 160 and path 161. Next, with reference to a table 2100 illustrated in FIG. 21, description is given of first to seventh operation patterns in operation example 2.

The first operation pattern is an operation pattern when the access control apparatus 100 receives a normal response through the path 160 before receiving a response to the access switch command. In the first operation pattern, the access control apparatus 100 outputs the normal response to the request source of the access request without outputting an access command to the CM 141 through the path 161.

The second operation pattern is an operation pattern when the access control apparatus 100 receives an error response through the path 160 and receives a normal response through the path 161 before receiving a response to the access switch command. In the second operation pattern, the access control apparatus 100 outputs the normal response to the request source of the access request.

The third operation pattern is an operation pattern when the access control apparatus 100 determines that there is no response through the path 160 and receives a normal response through the path 161. In the third operation pattern, the access control apparatus 100 outputs the normal response to the request source of the access request.

The fourth operation pattern is an operation pattern when the access control apparatus 100 receives an error response through the path 160 and receives an error response through the path 161 before receiving a response to the access switch command. In the fourth operation pattern, the access control apparatus 100 outputs the error response to the request source of the access request.

The fifth operation pattern is an operation pattern when the access control apparatus 100 determines that there is no response through the path 160 and receives an error response through the path 161. In the fifth operation pattern, the access control apparatus 100 outputs the error response to the request source of the access request.

The sixth operation pattern is an operation pattern when the access control apparatus 100 receives an error response through the path 160 and determines that there is no response through the path 161 before receiving a response to the access switch command. In the sixth operation pattern, the access control apparatus 100 outputs the error response to the request source of the access request. Moreover, in the sixth operation pattern, the access control apparatus 100 cancels mirroring by the mirror software 230 before outputting the error response to the request source of the access request through the multipath driver 120. To be more specific, the mirror software 230 cancels the mirroring since the standby time described above has passed.

The seventh operation pattern is an operation pattern when the access control apparatus 100 determines that there is no response through the path 160 and determines that there is no response through the path 161. In the seventh operation pattern, the access control apparatus 100 outputs the error response to the request source of the access request. Moreover, in the seventh operation pattern, the access control apparatus 100 cancels mirroring by the mirror software 230 before outputting the error response to the request source of the access request through the multipath driver 120. To be more specific, the mirror software 230 cancels the mirroring since the standby time described above has passed.

(Concrete Example of First Operation Pattern in Operation Example 2)

Figure 22:
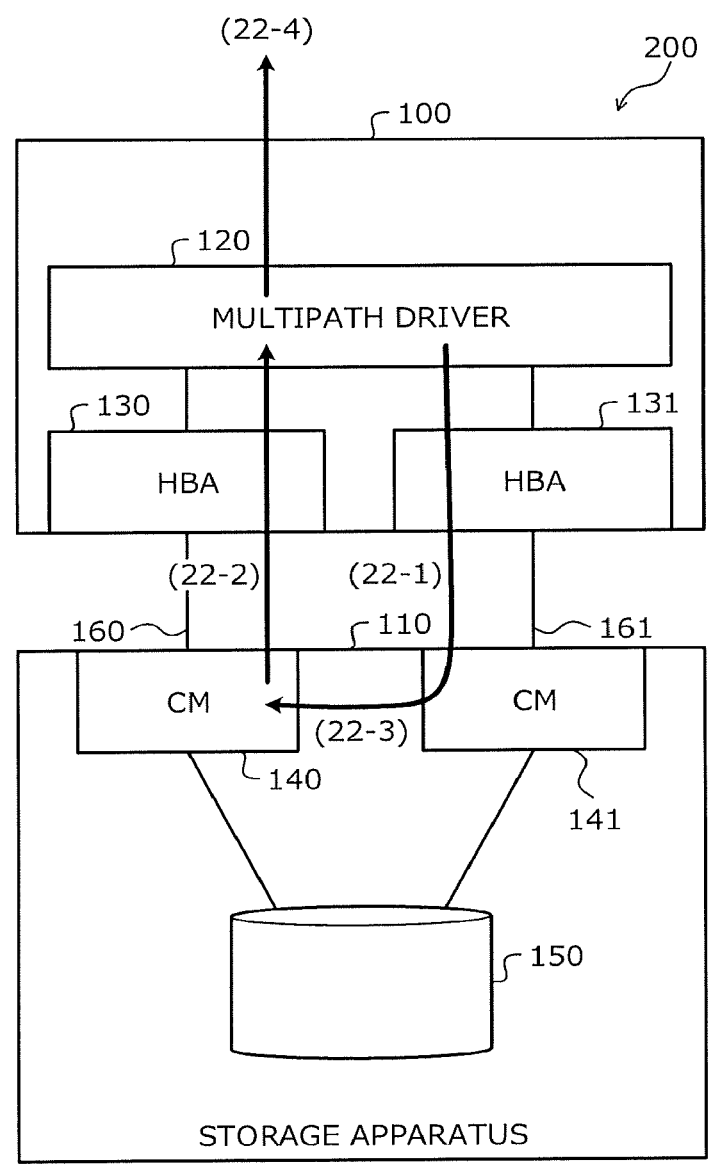
FIG. 22 is an explanatory diagram illustrating a concrete example of a first operation pattern in operation example 2.

Next, with reference to FIG. 22, description is given of a concrete example of the first operation pattern in operation example 2 illustrated in FIG. 21.

FIG. 22 is an explanatory diagram illustrating the concrete example of the first operation pattern in operation example 2. In the example of FIG. 22, it is assumed that the access control apparatus 100 replicates write data, if an access command is a command to write the write data into the storage device 150, and then outputs the access command to the CM 140 through the path 160.

(22-1) Since no response to the access command is received even after a predetermined time has passed since the output of the access command to the CM 140 through the path 160, the access control apparatus 100 outputs an access switch command to the CM 141 through the path 161.

(22-2) The access control apparatus 100 receives a normal response to the access command from the CM 140 through the path 160 before receiving a response to the access switch command. The access control apparatus 100 receives the normal response to the access command from the CM 140 through the path 160, and thus does not set the path 160 to offline.

(22-3) The CM 141 stops the processing by the CM 140 in response to the access switch command. The access control apparatus 100 receives a notification indicating that the processing by the CM 140 is stopped from the CM 141 through the path 161.

(22-4) The access control apparatus 100 receives a normal response to the access command from the CM 140, and thus outputs the normal response to the request source of the access request without outputting an access command to the CM 141 through the path 161.

Here, the description is given of the case where the access control apparatus 100 does not set the path 160 to offline. However, the embodiment is not limited thereto. For example, the access control apparatus 100 may set the path 160 to offline since the predetermined time has passed since the output of the access command through the path 160 and there may be a failure in the path 160 or the CM 140.

The access control apparatus 100 may output the next access command through the path 161. Thus, the access control apparatus 100 may improve the reliability of the storage system 200 by not using the path 160 or the CM 140 with a possible failure for the next access command.

(Concrete Example of Second Operation Pattern in Operation Example 2)

Figure 23:
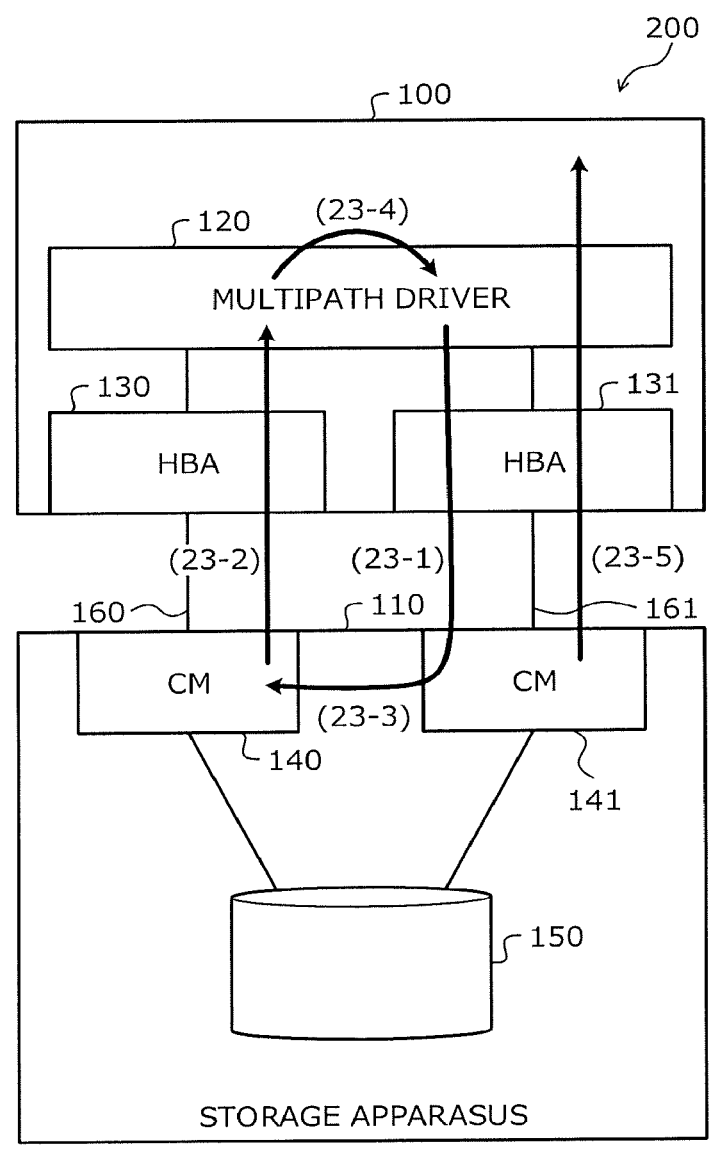
FIG. 23 is an explanatory diagram illustrating a concrete example of a second operation pattern in operation example 2.

Next, with reference to FIG. 23, description is given of a concrete example of the second operation pattern in operation example 2 illustrated in FIG. 21.

FIG. 23 is an explanatory diagram illustrating the concrete example of the second operation pattern in operation example 2. In the example of FIG. 23, it is assumed that the access control apparatus 100 replicates write data, if an access command is a command to write the write data into the storage device 150, and then outputs the access command to the CM 140 through the path 160.

(23-1) Since no response to the access command is received even after a predetermined time has passed since the output of the access command to the CM 140 through the path 160, the access control apparatus 100 outputs an access switch command to the CM 141 through the path 161.

(23-2) The access control apparatus 100 receives an error response to the access command from the CM 140 through the path 160 before receiving a response to the access switch command. The access control apparatus 100 receives the error response to the access command from the CM 140 through the path 160, and thus may set the path 160 to offline.

Thus, the access control apparatus 100 may improve the reliability of the storage system 200 by not using the path 160 or the CM 140 with a possible failure. Moreover, the access control apparatus 100 may output the next access command through the path 161 and thus may reduce the time it takes to output the next access command.

(23-3) The CM 141 stops the processing by the CM 140 in response to the access switch command and transmits a notification indicating that the processing by the CM 140 is stopped to the access control apparatus 100. Then, the access control apparatus 100 receives the notification indicating that the processing by the CM 140 is stopped from the CM 141 through the path 161.

(23-4) The access control apparatus 100 outputs an access command to the CM 141 through the path 161 since the processing by the CM 140 is stopped and a response to the access command is received from the CM 140 through the path 160.

(23-5) The access control apparatus 100 receives a normal response to the access command from the CM 141 through the path 161. The access control apparatus 100 outputs the normal response to the request source of the access request since the normal response to the access command is received from the CM 141.

(Concrete Example of Third Operation Pattern in Operation Example 2)

Figure 24:
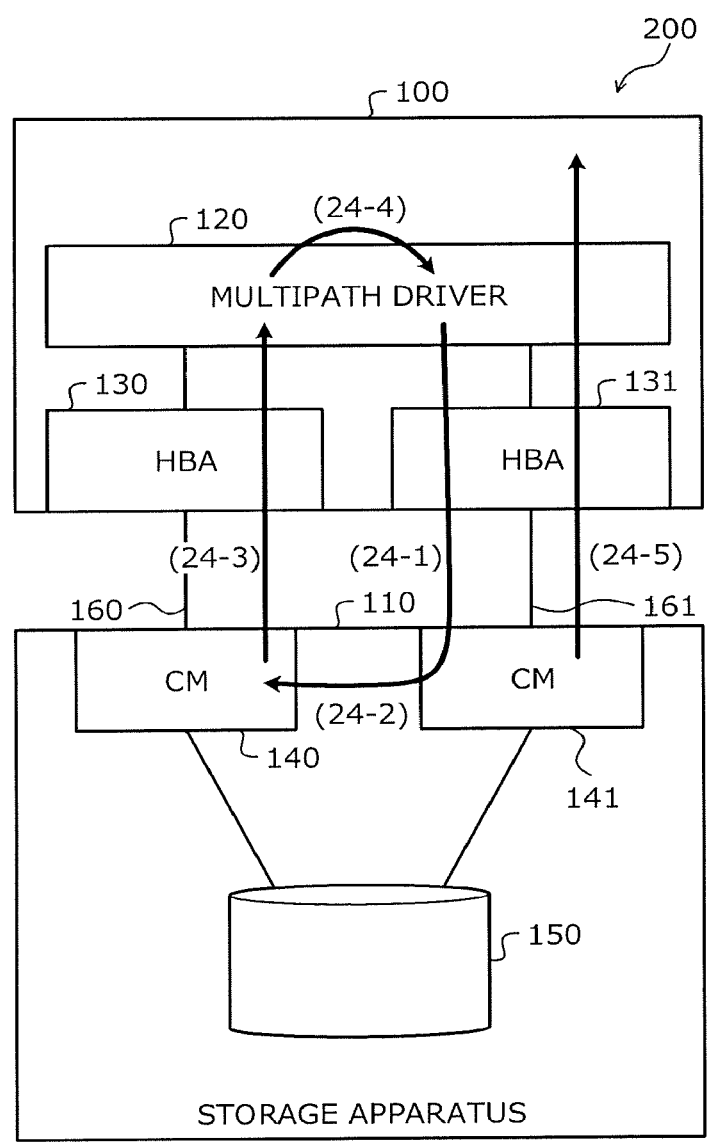
FIG. 24 is an explanatory diagram illustrating a concrete example of a third operation pattern in operation example 2.

Next, with reference to FIG. 24, description is given of a concrete example of the third operation pattern in operation example 2 illustrated in FIG. 21.

FIG. 24 is an explanatory diagram illustrating the concrete example of the third operation pattern in operation example 2. In the example of FIG. 24, it is assumed that the access control apparatus 100 replicates write data, if an access command is a command to write the write data into the storage device 150, and then outputs the access command to the CM 140 through the path 160.

(24-1) Since no response to the access command is received even after a predetermined time has passed since the output of the access command to the CM 140 through the path 160, the access control apparatus 100 outputs an access switch command to the CM 141 through the path 161.

(24-2) The CM 141 stops the processing by the CM 140 in response to the access switch command, and transmits a notification indicating that the processing by the CM 140 is stopped to the access control apparatus 100. Alternatively, since the processing by the CM 140 is already stopped when there is a failure in the CM 140, the CM 141 may transmit a notification indicating that the processing by the CM 140 is stopped to the access control apparatus 100. The access control apparatus 100 receives the notification indicating that the processing by the CM 140 is stopped from the CM 141 through the path 161.

(24-3) The access control apparatus 100 receives an error response to the access command, due to the fact that the processing by the CM 140 is stopped by the CM 141, from the CM 140 through the path 160. The access control apparatus 100 receives an error response to the access command from the HBA 130, since there is no response from the CM 140 through the path 160, when there is a failure in the CM 140 or the path 160. Here, the access control apparatus 100 may set the path 160 to offline.

Thus, the access control apparatus 100 may improve the reliability of the storage system 200 by not using the path 160 or the CM 140 with a possible failure. Moreover, the access control apparatus 100 may output the next access command through the path 161 and thus may reduce the time it takes to output the next access command.

(24-4) The access control apparatus 100 outputs an access command to the CM 141 through the path 161 since the processing by the CM 140 is stopped and a response to the access command is received from the CM 140 through the path 160.

(24-5) The access control apparatus 100 receives a normal response to the access command from the CM 141 through the path 161. The access control apparatus 100 outputs the normal response to the request source of the access request since the normal response to the access command is received from the CM 141.

Thus, the access control apparatus 100 may sometimes stop the processing by the CM 140 and receive an error response to the access command, due to the fact that the processing by the CM 140 is stopped, from the CM 140 before the CM 140 actively outputs an error response. As a result, the access control apparatus 100 may suppress an increase in time it takes to respond to the request source of the access request while reducing the destruction of data with the access switch command even when waiting for a response to the access command from the CM 140 through the path 160.

(Concrete Example of Fourth Operation Pattern in Operation Example 2)

Figure 25:
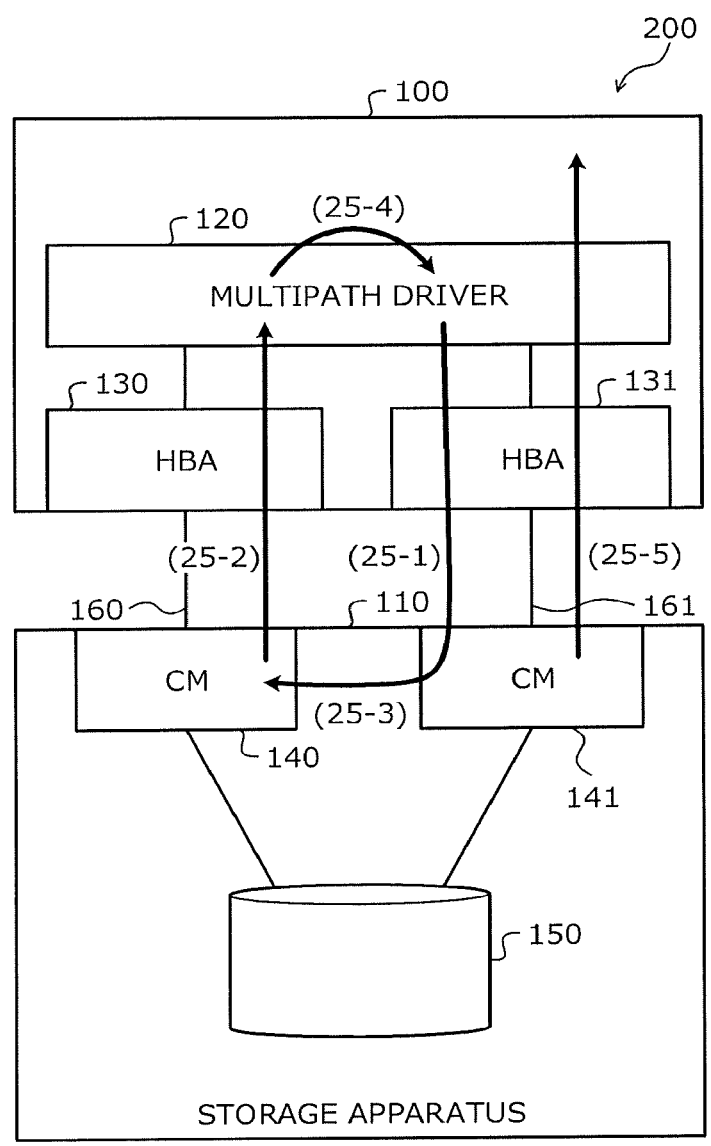
FIG. 25 is an explanatory diagram illustrating a concrete example of a fourth operation pattern in operation example 2.

Next, with reference to FIG. 25, description is given of a concrete example of the fourth operation pattern in operation example 2 illustrated in FIG. 21.

FIG. 25 is an explanatory diagram illustrating the concrete example of the fourth operation pattern in operation example 2. In the example of FIG. 25, it is assumed that the access control apparatus 100 replicates write data, if an access command is a command to write the write data into the storage device 150, and then outputs the access command to the CM 140 through the path 160.

(25-1) Since no response to the access command is received even after a predetermined time has passed since the output of the access command to the CM 140 through the path 160, the access control apparatus 100 outputs an access switch command to the CM 141 through the path 161.

(25-2) The access control apparatus 100 receives an error response to the access command from the CM 140 through the path 160 before receiving a response to the access switch command.

(25-3) The CM 141 stops the processing by the CM 140 in response to the access switch command and transmits a notification indicating that the processing by the CM 140 is stopped to the access control apparatus 100. Then, the access control apparatus 100 receives the notification indicating that the processing by the CM 140 is stopped from the CM 141 through the path 161.

(25-4) The access control apparatus 100 outputs an access command to the CM 141 through the path 161 since the processing by the CM 140 is stopped and a response to the access command is received from the CM 140 through the path 160.

(25-5) The access control apparatus 100 receives an error response to the access command from the CM 141 through the path 161. The access control apparatus 100 outputs the error response to the request source of the access request since the error response to the access command is received from the CM 140 and the error response to the access command is received from the CM 141.

(Concrete Example of Fifth Operation Pattern in Operation Example 2)

Figure 26:
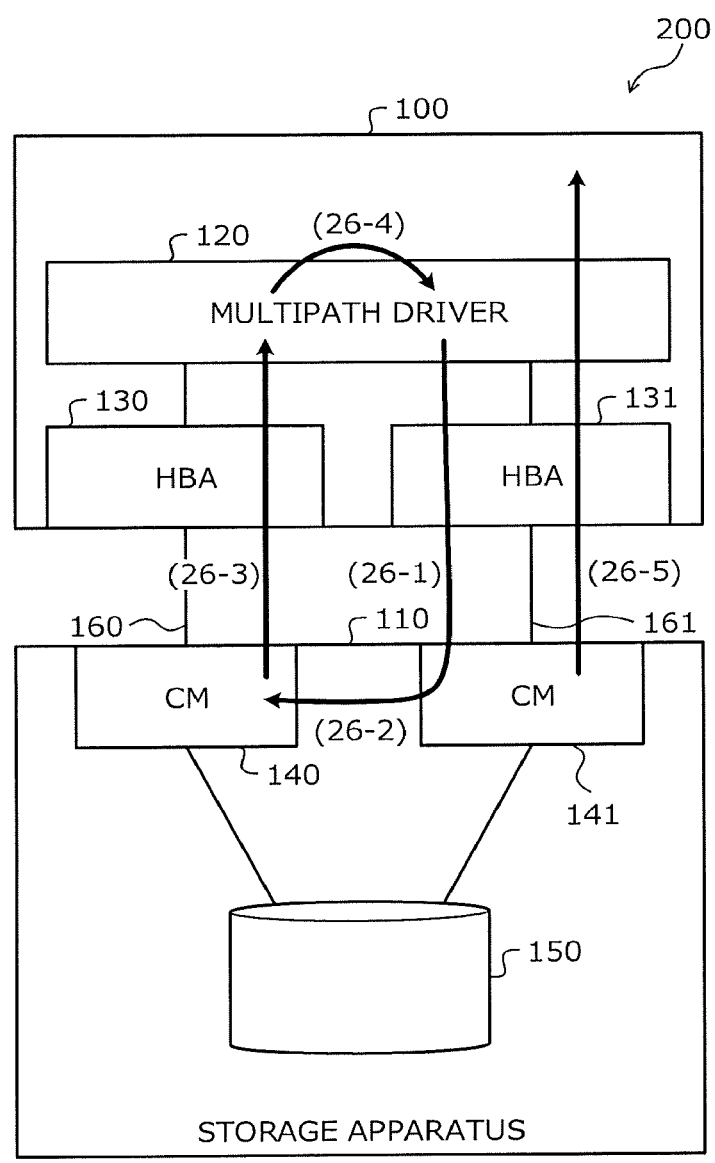
FIG. 26 is an explanatory diagram illustrating a concrete example of a fifth operation pattern in operation example 2.

Next, with reference to FIG. 26, description is given of a concrete example of the fifth operation pattern in operation example 2 illustrated in FIG. 21.

FIG. 26 is an explanatory diagram illustrating the concrete example of the fifth operation pattern in operation example 2. In the example of FIG. 26, it is assumed that the access control apparatus 100 replicates write data, if an access command is a command to write the write data into the storage device 150, and then outputs the access command to the CM 140 through the path 160.

(26-1) Since no response to the access command is received even after a predetermined time has passed since the output of the access command to the CM 140 through the path 160, the access control apparatus 100 outputs an access switch command to the CM 141 through the path 161.

(26-2) The CM 141 stops the processing by the CM 140 in response to the access switch command, and transmits a notification indicating that the processing by the CM 140 is stopped to the access control apparatus 100. Alternatively, since the processing by the CM 140 is already stopped when there is a failure in the CM 140, the CM 141 may transmit a notification indicating that the processing by the CM 140 is stopped to the access control apparatus 100. The access control apparatus 100 receives the notification indicating that the processing by the CM 140 is stopped from the CM 141 through the path 161.

(26-3) The access control apparatus 100 receives an error response to the access command, due to the fact that the processing by the CM 140 is stopped by the CM 141, from the CM 140 through the path 160. The access control apparatus 100 receives an error response to the access command from the HBA 130, since there is no response from the CM 140 through the path 160, when there is a failure in the CM 140 or the path 160.

(26-4) The access control apparatus 100 outputs an access command to the CM 141 through the path 161 since the processing by the CM 140 is stopped and a response to the access command is received from the CM 140 through the path 160.

(26-5) The access control apparatus 100 receives an error response to the access command from the CM 141 through the path 161. The access control apparatus 100 outputs the error response to the request source of the access request since the error response to the access command is received from the CM 140 and the error response to the access command is received from the CM 141.

Thus, the access control apparatus 100 may sometimes stop the processing by the CM 140 and receive an error response to the access command, due to the fact that the processing by the CM 140 is stopped, from the CM 140 before the CM 140 actively outputs an error response. As a result, the access control apparatus 100 may suppress an increase in time it takes to respond to the request source of the access request while reducing the destruction of data with the access switch command even when waiting for a response to the access command from the CM 140 through the path 160.

(Concrete Example of Sixth Operation Pattern in Operation Example 2)

Figure 27:
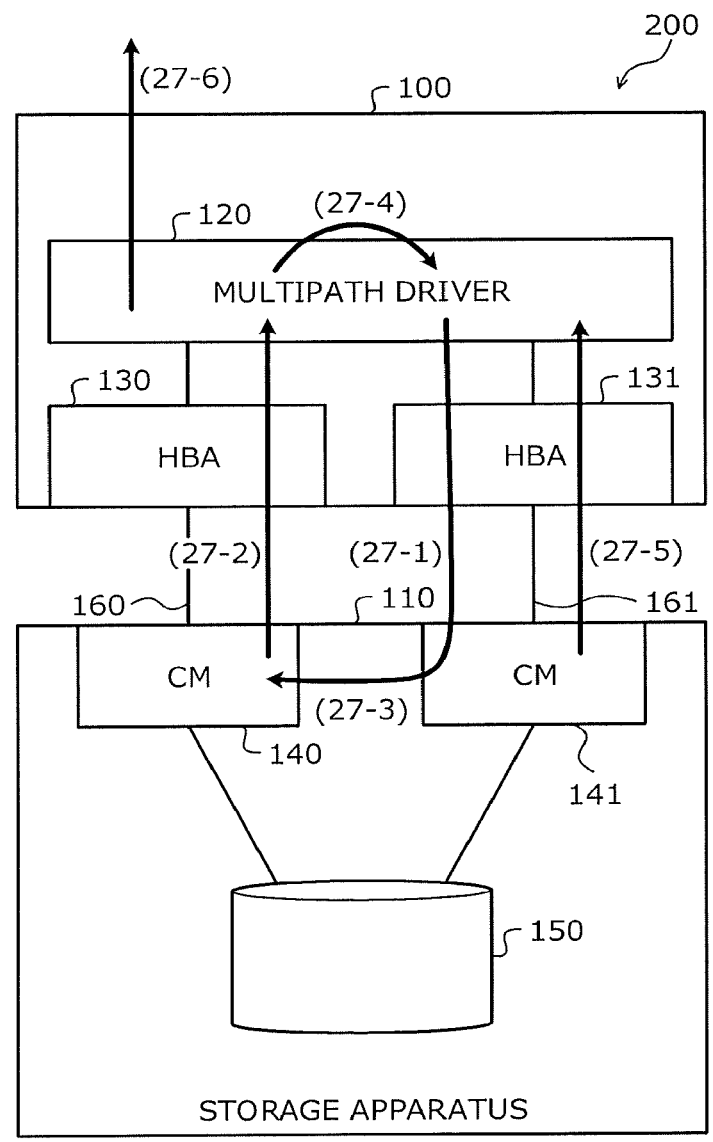
FIG. 27 is an explanatory diagram illustrating a concrete example of a sixth operation pattern in operation example 2.

Next, with reference to FIG. 27, description is given of a concrete example of the sixth operation pattern in operation example 2 illustrated in FIG. 21.

FIG. 27 is an explanatory diagram illustrating the concrete example of the sixth operation pattern in operation example 2. In the example of FIG. 27, it is assumed that the access control apparatus 100 replicates write data, if an access command is a command to write the write data into the storage device 150, and then outputs the access command to the CM 140 through the path 160.

(27-1) Since no response to the access command is received even after a predetermined time has passed since the output of the access command to the CM 140 through the path 160, the access control apparatus 100 outputs an access switch command to the CM 141 through the path 161.

(27-2) The access control apparatus 100 receives an error response to the access command from the CM 140 through the path 160 before receiving a response to the access switch command.

(27-3) The CM 141 stops the processing by the CM 140 in response to the access switch command and transmits a notification indicating that the processing by the CM 140 is stopped to the access control apparatus 100. Then, the access control apparatus 100 receives the notification indicating that the processing by the CM 140 is stopped from the CM 141 through the path 161.

(27-4) The access control apparatus 100 outputs an access command to the CM 141 through the path 161 since the processing by the CM 140 is stopped and a response to the access command is received from the CM 140 through the path 160.

(27-5) The access control apparatus 100 receives an error response to the access command from the HBA 131 since the HBA 131 determines that there is no response from the CM 141 through the path 161.

(27-6) The access control apparatus 100 outputs the error response to the request source of the access request since the error response to the access command is received from the CM 140 and the error response to the access command is received from the HBA 131.

(Concrete Example of Seventh Operation Pattern in Operation Example 2)

Figure 28:
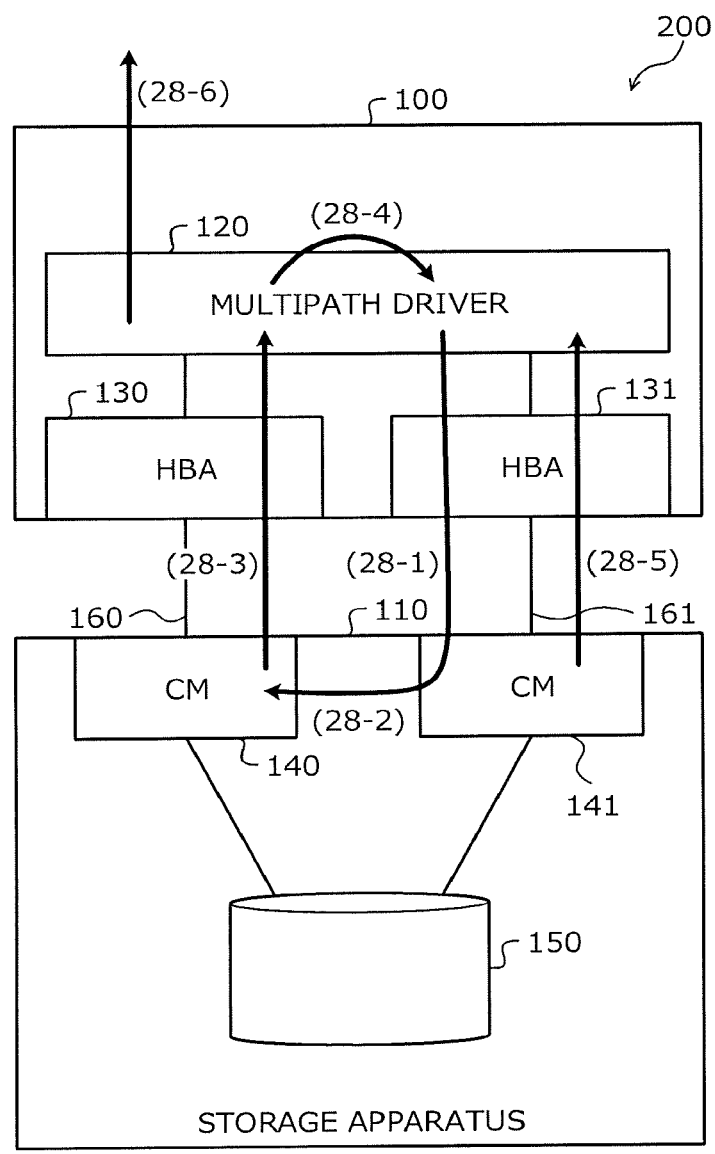
FIG. 28 is an explanatory diagram illustrating a concrete example of a seventh operation pattern in operation example 2.

Next, with reference to FIG. 28, description is given of a concrete example of the seventh operation pattern in operation example 2 illustrated in FIG. 21.

FIG. 28 is an explanatory diagram illustrating the concrete example of the seventh operation pattern in operation example 2. In the example of FIG. 28, it is assumed that the access control apparatus 100 replicates write data, if an access command is a command to write the write data into the storage device 150, and then outputs the access command to the CM 140 through the path 160.

(28-1) Since no response to the access command is received even after a predetermined time has passed since the output of the access command to the CM 140 through the path 160, the access control apparatus 100 outputs an access switch command to the CM 141 through the path 161.

(28-2) The CM 141 stops the processing by the CM 140 in response to the access switch command, and transmits a notification indicating that the processing by the CM 140 is stopped to the access control apparatus 100. Alternatively, since the processing by the CM 140 is already stopped when there is a failure in the CM 140, the CM 141 may transmit a notification indicating that the processing by the CM 140 is stopped to the access control apparatus 100. The access control apparatus 100 receives the notification indicating that the processing by the CM 140 is stopped from the CM 141 through the path 161.

(28-3) The access control apparatus 100 receives an error response to the access command, due to the fact that the processing by the CM 140 is stopped by the CM 141, from the CM 140 through the path 160. The access control apparatus 100 receives an error response to the access command from the HBA 130, since there is no response from the CM 140 through the path 160, when there is a failure in the CM 140 or the path 160.

(28-4) The access control apparatus 100 outputs an access command to the CM 141 through the path 161 since the processing by the CM 140 is stopped and a response to the access command is received from the CM 140 through the path 160.

(28-5) The access control apparatus 100 receives an error response to the access command from the HBA 131 since the HBA 131 determines that there is no response from the CM 141 through the path 161.

(28-6) The access control apparatus 100 outputs the error response to the request source of the access request since the error response to the access command is received from the HBA 130 and the error response to the access command is received from the HBA 131.

Thus, the access control apparatus 100 may sometimes stop the processing by the CM 140 and receive an error response to the access command, due to the fact that the processing by the CM 140 is stopped, from the CM 140 before the CM 140 actively outputs an error response. As a result, the access control apparatus 100 may suppress an increase in time it takes to respond to the request source of the access request while reducing the destruction of data with the access switch command even when waiting for a response to the access command from the CM 140 through the path 160.

(Example of Initialization Procedure According to Operation Example 2)

An example of an initialization procedure according to operation example 2 is the same as the example of the initialization procedure according to operation example 1 illustrated in FIG. 17, and thus description thereof is omitted.

(Example of Access Processing Procedure According to Operation Example 2)

Figure 29:
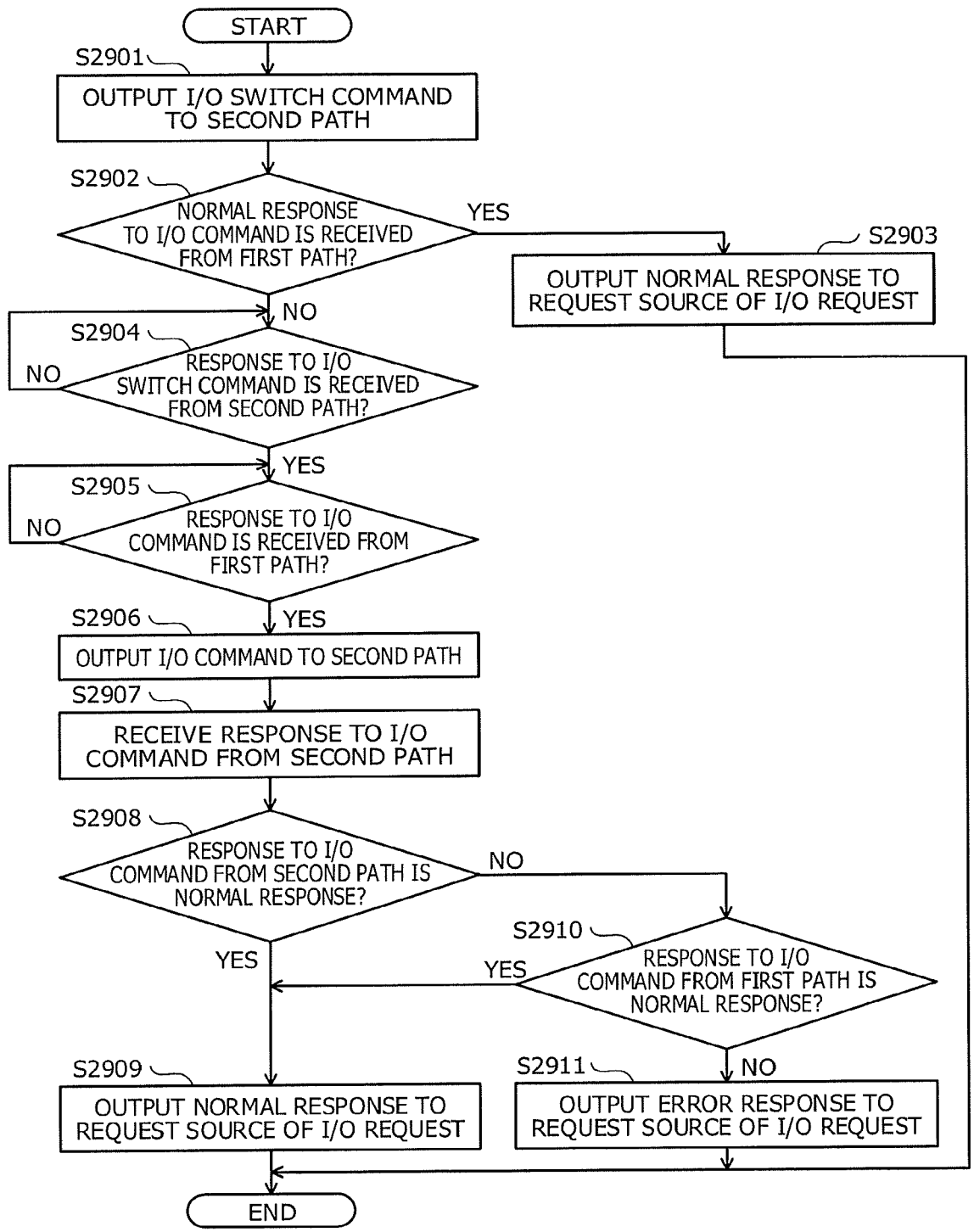
FIG. 29 is a flowchart illustrating an example of an access processing procedure according to operation example 2.

Next, with reference to FIG. 29, description is given of an example of an access processing procedure according to operation example 2.

FIG. 29 is a flowchart illustrating an example of the access processing procedure according to operation example 2. The access control apparatus 100 moves to processing of Step S2901 in FIG. 29 after performing the same processing as that of Steps S1801 to S1811 in the example of the access processing procedure according to operation example 1 illustrated in FIG. 18.

In FIG. 29, the access control apparatus 100 outputs an access switch command with wwn of the first path and information indicating the CM set as an argument to the second path (Step S2901). Next, the access control apparatus 100 determines whether or not there is a normal response to the access command from the first path (Step S2902). When there is a normal response to the access command from the first path (Step S2902: Yes), the access control apparatus 100 outputs the normal response to the request source of the access request (S2903) and then terminates the access processing.

On the other hand, when there is no normal response to the access command from the first path (Step S2902: No), the access control apparatus 100 determines whether or not there is a response to the access switch command from the second path (Step S2904). Here, when there is no response to the access switch command from the second path (Step S2904: No), the access control apparatus 100 returns to the processing of Step S2904.

On the other hand, when there is a response to the access switch command from the second path (Step S2904: Yes), the access control apparatus 100 determines whether or not there is a response to the access command to the first path (Step S2905). The response is, for example, an error response outputted, in response to the fact that the processing of the access command is stopped, by the CM coupled to the first path based on the access switch command.

Alternatively, the response may be an error response outputted from the HBA that controls the output of the access command to the first path, since there is a failure in the CM coupled to the first path or the first path. Alternatively, the response may be a normal response or an error response that is yet to reach the multipath driver at the point of Step S2902 but is already outputted by the CM coupled to the first path before the processing of the access command is stopped.

Here, when there is no response to the access command to the first path (Step S2905: No), the access control apparatus 100 moves to the processing of Step S2905. On the other hand, when there is a response to the access command to the first path (Step S2905: Yes), the access control apparatus 100 outputs an access command to the second path (Step S2906). Next, the access control apparatus 100 receives a response to the access command from the second path (Step S2907).

Then, the access control apparatus 100 determines whether or not the response to the access command from the second path is a normal response (Step S2908). Here, when the response is the normal response (Step S2908: Yes), the access control apparatus 100 outputs the normal response to the request source of the access request (Step S2909) and then terminates the access processing.

On the other hand, when the response is not the normal response in Step S2908 (Step S2908: No), the access control apparatus 100 determines whether or not the response to the access command from the first path is a normal response (Step S2910). Here, when the response is not the normal response (Step S2910: No), the access control apparatus 100 outputs an error response to the request source of the access request (Step S2911) and then terminates the access processing.

On the other hand, when the response is the normal response (Step S2910: Yes), the access control apparatus 100 moves to the processing of Step S2909.

(Example of Cancellation Procedure According to Operation Example 2)

An example of a cancellation procedure according to operation example 2 is the same as the example of the cancellation procedure according to operation example 1 illustrated in FIG. 20, and thus description thereof is omitted.

As described above, the access control apparatus 100 may output the access command to the storage device 150 through the path 160 coupled to the CM 140 upon receipt of the access request to the storage device 150. Also, the access control apparatus 100 may determine whether or not a response to the access command is received before the predetermined time passes after the output of the access command to the CM 140 through the path 160. Moreover, when no response to the access command is received even after the elapse of the predetermined time, the access control apparatus 100 may perform control to allow the CM 141 to stop the processing executed by the CM 140 according to the access command, through the path 161 coupled to the CM 141.

Furthermore, the access control apparatus 100 may output the access command through the path 161 after receiving the response to the control of stopping the processing according to the access command from the CM 141.

Thus, the access control apparatus 100 may allow the CM 141 to stop the processing executed by the CM 140 according to the access command, even before receiving a response from the HBA 130. As a result, the access control apparatus 100 may make it easier to reduce the time it takes to output the response to the request source of the access request. Moreover, the access control apparatus 100 may reduce the destruction of data by suppressing overlap between the access to the storage device 150 by the CM 140 and the access to the storage device 150 by the CM 141.

Moreover, the access control apparatus 100 may replicate the write data before outputting the access command through the path 160. Also, the access control apparatus 100 may output the access command through the path 161 based on the replicated write data, upon receipt of the response from the CM 141. Thus, the access control apparatus 100 may output the access command through the path 161 and allow the CM 141 to execute the access command even before receiving the response to the access command outputted through the path 160. Furthermore, the access control apparatus 100 may output the access command through the path 161 by using the replicated write data even if the original write data is deleted by the direct memory access.

The access control apparatus 100 may output the access command through the path 161 after receiving a response from the CM 141 and a response from the CM 140. Thus, the access control apparatus 100 may output the access command through the path 161 without replicating the write data, thus making it easier to reduce the usage of the memory 402.

When receiving a success response from the CM 140, the access control apparatus 100 may output the success response to the request source of the access request. Thus, the access control apparatus 100 may suppress an increase in time it takes to respond to the request source of the access request.

When receiving an error response from the CM 140 or determining that there is no response from the CM 140 and when receiving a success response from the CM 141, the access control apparatus 100 may output the success response to the request source of the access request. Thus, the access control apparatus 100 may suppress an increase in time it takes to respond to the request source of the access request.

When receiving an error response from the CM 140 or determining that there is no response from the CM 140 and when receiving an error response from the CM 141, the access control apparatus 100 may output the error response to the request source of the access request. Thus, the access control apparatus 100 may suppress an increase in time it takes to respond to the request source of the access request.

When receiving an error response from the CM 140 or determining that there is no response from the CM 140 and when determining that there is no response from the CM 141, the access control apparatus 100 may output the error response to the request source of the access request. Thus, the access control apparatus 100 may suppress an increase in time it takes to respond to the request source of the access request.

The access control apparatus 100 may output a stop command including information indicating the CM 140 to the CM 141 through the path 161, thereby allowing the CM 141 to stop the processing executed by the CM 140 according to the access command. Thus, the access control apparatus 100 may determine which one of the CMs included in the storage apparatus 110 may be stopped by the CM 141.

The access control apparatus 100 may output a stop command including information indicating the path 160, through the path 161, to the CM 141, thereby allowing the CM 141 to stop the processing related to the path 160 in the CM 140. Thus, the access control apparatus 100 may determine through which one of the paths coupled to the CM 140 the processing is executed that may be stopped by the CM 141.

The access control apparatus 100 may use a time not longer than the time it takes to determine that the CM 140 has failed to access the storage device 150, as the predetermined time. Thus, the access control apparatus 100 may make it easier to reduce the time it takes to output the response to the request source of the access request.

Note that the access control method described in this embodiment may be realized by executing a prepared program on a computer such as a personal computer or a work station. The access control program according to this embodiment is recorded on a computer-readable recording medium such as a hard disk, a flexible disk, a CD-ROM, an MO or a DVD, and is read from the recording medium and executed by the computer. Alternatively, the access control program according to this embodiment may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An access control apparatus comprising:
a memory; and
a processor coupled to the memory and configured to:
in response to an access request to a storage device, output an access command through a first path to a first controller among a plurality of controllers that control the storage device, the access command being a command to access the storage device;
when no response to the access command to the first controller is received before a predetermined time passes after the output of the access command, control a second controller different from the first controller among the plurality of controllers through a second path coupled to the second controller such that the second controller sends a cancel command to the first controller, wherein the cancel command indicates stopping processing executed by the first controller according to the access command;
output the access command through the second path after receiving a response to the control on the second controller; and
output a stop command including information indicating the first controller to the second controller through the second path, thereby allowing the second controller to stop the processing executed by the first controller according to the access command.

2. The access control apparatus according to claim 1, wherein
the access command is a command to write data into the storage device through direct memory access,
the processor replicates the data before outputting the access command through the first path, and
the processor outputs the access command through the second path based on the replicated data in response to receipt of the response to the control on the second controller.

3. The access control apparatus according to claim 1, wherein
after the processor receives the response to the control on the second controller and receives an error response to the access command to the first controller, the processor outputs the access command through the second path.

4. The access control apparatus according to claim 1, wherein
upon receipt of a success response to the access command to the first controller, the processor outputs a success response to a request source of the access request.

5. The access control apparatus according to claim 1, wherein
upon receipt of an error response to the access command to the first controller and of a success response to the access command to the second controller, the processor outputs a success response to a request source of the access request.

6. The access control apparatus according to claim 1, wherein
upon receipt of an error response to the access command to the first controller and of an error response to the access command to the second controller, the processor outputs an error response to a request source of the access request.

7. The access control apparatus according to claim 1, wherein
the processor outputs a stop command including information indicating the first path to the second controller through the second path, thereby allowing the second controller to stop processing executed by the first controller for the first path.

8. The access control apparatus according to claim 1, wherein
the predetermined time is not more than a time which takes for determining that the first controller has failed to access the storage device after requesting the access to the storage device.

9. An access control method comprising:
in response to an access request to a storage device, outputting, by a processor, an access command through a first path to a first controller among a plurality of controllers that control the storage device, the access command being a command to access the storage device;
when no response to the access command to the first controller is received before a predetermined time passes after the output of the access command, controlling, by a processor, a second controller different from the first controller among the plurality of controllers through a second path coupled to the second controller such that the second controller sends a cancel command to the first controller, wherein the cancel command indicates stopping processing executed by the first controller according to the access command;
outputting, by a processor, the access command through the second path after receiving a response to the control on the second controller, and
outputting a stop command including information indicating the first controller to the second controller through the second path, thereby allowing the second controller to stop the processing executed by the first controller according to the access command.

* * * * *